(12) United States Patent
Iwasaki et al.

(10) Patent No.: US 7,995,843 B2
(45) Date of Patent: Aug. 9, 2011

(54) MONITORING DEVICE WHICH MONITORS MOVING OBJECTS

(75) Inventors: Masahiro Iwasaki, Nara (JP); Taro Imagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 1072 days.

(21) Appl. No.: 11/404,894

(22) Filed: Apr. 17, 2006

(65) Prior Publication Data

US 2006/0195199 A1 Aug. 31, 2006

Related U.S. Application Data

(63) Continuation of application No. PCT/JP2004/015086, filed on Oct. 6, 2004.

(30) Foreign Application Priority Data

Oct. 21, 2003 (JP) .................................. 2003-361060

(51) Int. Cl.
*G06K 9/42* (2006.01)
*G05B 11/36* (2006.01)

(52) U.S. Cl. ........ 382/190; 348/169; 382/170; 382/171; 382/172; 382/237; 700/1

(58) Field of Classification Search .................. 382/181; 700/1
See application file for complete search history.

(56) References Cited

U.S. PATENT DOCUMENTS

| | | | | |
|---|---|---|---|---|
| 6,061,091 A | * | 5/2000 | Van de Poel et al. | 348/241 |
| 6,332,038 B1 | * | 12/2001 | Funayama et al. | 382/190 |
| 6,353,764 B1 | * | 3/2002 | Imagawa et al. | 700/1 |
| 2002/0175997 A1 | * | 11/2002 | Takata et al. | 348/143 |
| 2003/0059081 A1 | * | 3/2003 | Trajkovic | 382/100 |
| 2003/0059117 A1 | * | 3/2003 | Iwasa et al. | 382/224 |
| 2003/0108225 A1 | * | 6/2003 | Li | 382/118 |

FOREIGN PATENT DOCUMENTS

| | | |
|---|---|---|
| EP | 0 716 402 | 6/1996 |
| EP | 1 403 817 | 3/2004 |

(Continued)

OTHER PUBLICATIONS

Iwasawa, "Real-time human posture estimation using monocular thermal images," 1998, IEEE interational conference on Digital Object Identifier, pp. 492-497.*

(Continued)

*Primary Examiner* — John Lee
(74) *Attorney, Agent, or Firm* — Wenderoth, Lind & Ponack, L.L.P.

(57) ABSTRACT

A monitoring device includes: a moving object image generation unit which receives, on a frame-by-frame basis, an overall image captured by a camera and performs inter-frame differential processing on the overall image or background differential processing between the overall image and a background image that is previously prepared; a density calculation unit which transforms the differential processed image into one-dimensional information and calculates a density indicating a degree of density of moving objects or of a crowd through frequency analysis; a model generation unit which calculates a reference density of the moving objects or of the crowd based on the density of a predetermined date and time; and a situation determination unit which compares between the density at the current time and the reference density, determines whether or not the density at the current time is different from the reference density, and generates a determination result.

3 Claims, 17 Drawing Sheets

FOREIGN PATENT DOCUMENTS

| | | |
|---|---|---|
| GB | 2 343 945 | 5/2000 |
| JP | 4-91589 | 3/1992 |
| JP | 07-296166 | 11/1995 |
| JP | 08-161292 | 6/1996 |
| JP | 8-167022 | 6/1996 |
| JP | 10-081480 | 3/1998 |
| JP | 10-91794 | 4/1998 |
| JP | 11-339139 | 12/1999 |
| JP | 2000-163600 | 6/2000 |
| JP | 2001-099461 | 4/2001 |
| JP | 2003-058884 | 2/2003 |
| JP | 2003-296869 | 10/2003 |
| WO | 02/21441 | 3/2002 |

OTHER PUBLICATIONS

Velastin et al., "Estimation of crowd density using image process," IEEE, Mar. 10, 1997, pp. 1-8.*

Lin et al., "Estimation of number of people in crowded scenes using perspective transformation," IEEE, Nov. 2001, vol. 3, pp. 645-654.*

* cited by examiner

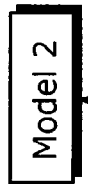
FIG. 7A
Fri, Sat & Holidays 23:00~6:00
Sunny Spring, Summer & Fall
Model 1
FIG. 7B
Mon ~ Fri 8:00~9:00 Sunny Winter
Mon ~ Fri 7:00~8:00 Sunny Spring, Summer & Fall
Mon ~ Fri 17:00~19:00 Sunny Spring, Summer, Fall & Winter
Model 2
FIG. 7C
Sun & Holidays 9:00~12:00 Rainy all season
Sun & Holidays 17:00~22:00 Rainy all season
Model 3
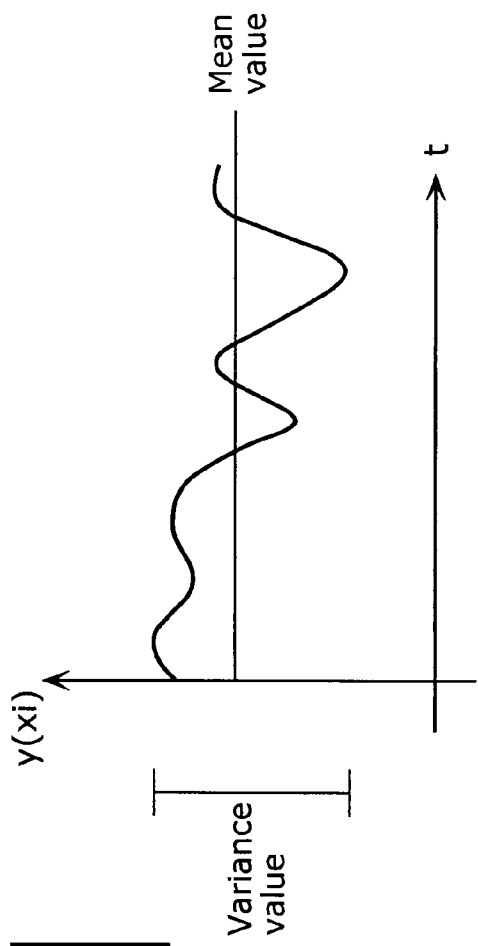
FIG. 7D

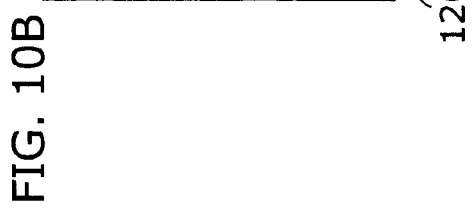
FIG. 10A
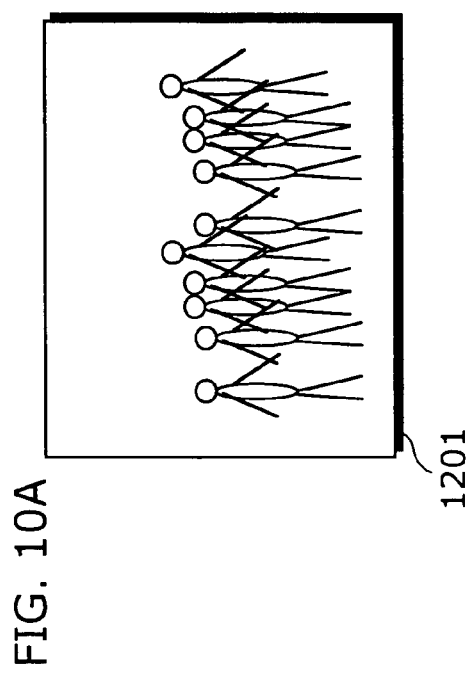
FIG. 10B
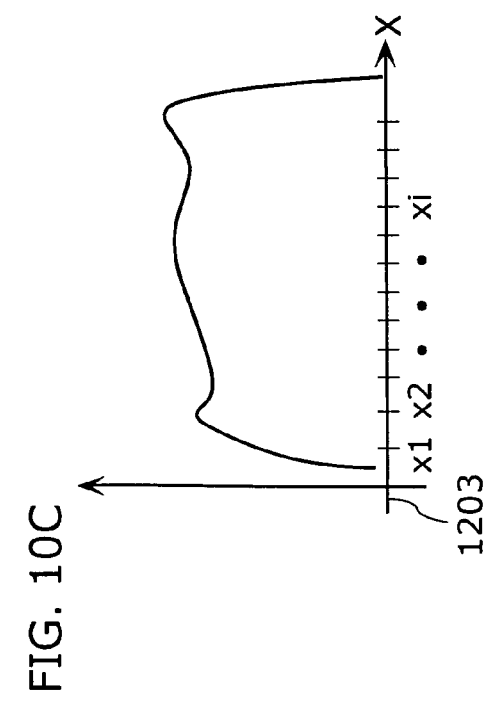
FIG. 10C
FIG. 10D

MONITORING DEVICE WHICH MONITORS MOVING OBJECTS

CROSS REFERENCE TO RELATED APPLICATION

This is a continuation application of PCT application No. PCT/JP2004/015086 filed Oct. 6, 2004, designating the United States of America.

BACKGROUND OF THE INVENTION (1) Field of the Invention

The present invention relates to a monitoring device which monitors moving objects that are moving such as persons and vehicles or a crowd.

(2) Description of the Related Art

A device shown in FIG. 1 is known as a conventional monitoring device (refer to Japanese Laid-Open Patent Application No. 11-399139). As shown in FIG. 1, this conventional monitoring device 10 includes an image-capturing device 11, a part location extraction unit 12, a shape characteristic extraction unit 13, a part location tracking unit 14, a motion characteristic measurement unit 15, a comparison search unit 16 and a display unit 17.

As shown in FIG. 1, in the conventional monitoring device 10, the part location extraction unit 12 extracts a part location of a person; the shape characteristic extraction unit 13 extracts a characteristic of a shape; the part location tracking unit 14 tracks the extracted part location; and the motion characteristic measurement unit 15 measures a characteristic of a motion. The conventional monitoring device 10 automatically extracts characteristics of a person in a monitored region and compiled into a computer database, while it searches for, examines and tracks a candidate having specific characteristics and identifies a suspicious person by bringing attention to a surveillant.

Also, another conventional monitoring device is disclosed in Japanese Laid-Open Patent Application No. 2000-163600. This another conventional monitoring device extracts a skin color and a motion of an object captured by the image-capturing device, automatically selects and tracks the most appropriate object to be tracked, captures an image of a face part of the object, and identifies an individual by analyzing the captured face image. Further, the monitoring device identifies, from the face part information, a mask, a pair of sunglasses, a hat and the like so as to determine the object as a dangerous person.

However, with the current technology, it is difficult for the conventional monitoring devices to completely automate, in the case of detecting a person and matching the characteristics of the person with information stored in a database, the process of matching, particularly with a large amount of accumulated information in the database. Also, in the case where there are images of persons in an overall picture or where occlusion occurs, it is difficult for the conventional monitoring devices to precisely specify a part location and extract a face image. Therefore, if the process of detecting and tracking a person and matching the characteristics of the person with the large amount information in the database is completely automated, there are problems of causing detection miss, tracking miss and matching miss which may be obstacles to determining a current situation as an abnormal state.

SUMMARY OF THE INVENTION

Considering the aforementioned problems, an object of the present invention is to provide a monitoring device which, even in the case where a part such as a person's face cannot be detected precisely, can prevent a detection miss, a tracking miss and a matching miss, can determine a current situation as an abnormal state, and can bring attention to a surveillant, by detecting and tracking moving objects or an image of a crowd in an overall image not at an individual level but at a macro level.

In order to overcome the object, a monitoring device according to the present invention is a monitoring device which monitors a region to be monitored, the device including: an image-capturing unit which captures an image within the monitored region, and generates an overall image; a moving object image generation unit which generates, from the overall image generated by the image-capturing unit, a moving object image that is an image of moving objects or of a crowd; and a density calculation unit which calculates, based on the moving object image generated by the moving object image generation unit, a degree of density of the moving objects or of the crowd, as a density that is parameterized by a function approximation or a frequency transformation.

Further, a monitoring device according to the present invention is a monitoring device which monitors a region to be monitored, the device including: an image-capturing unit which captures an image within the monitored region, and generates an overall image; a moving object image generation unit which generates, from the overall image generated by the image-capturing unit, a moving object image that is an image of moving objects or of a crowd; a density calculation unit which calculates, based on the moving object image generated by the moving object image generation unit, a density indicating a degree of density of the moving objects or of the crowd; and a situation judgment unit which compares between the density at a current time calculated by the density calculation unit and a reference density which is a degree of density to be the basis for determining a situation, and determines that the situation at the current time is in an abnormal state in the case where a difference between the density at the current time and the reference density is greater than or equal to a predetermined threshold; another image-capturing unit having at least one of functions of pan, tilt, and zoom; and an image-capturing control unit which controls the another image-capturing unit so that the another image-capturing unit captures a region in which the density at the current time differs from the reference density, in the case where the situation determination unit determines that the situation at the current time is in the abnormal state.

As described above, the monitoring device according to the present invention can prevent a detection miss, a tracking miss and a matching miss from occurring and bring attention to the surveillant, by determining that a current state is in an abnormal state in the case where the density or the moving direction of the moving objects or of the crowd is different from that in the normal state, even in the case where a part such as a person's face cannot be detected precisely.

FURTHER INFORMATION ABOUT TECHNICAL BACKGROUND TO THIS APPLICATION

The disclosure of Japanese Patent Application No. 2003-361060 filed on Oct. 21, 2003 including specification, drawings and claims is incorporated herein by reference in its entirety.

The disclosure of PCT application No. PCT/JP2004/015086 filed, Oct. 6, 2004, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 7 is a diagram for explaining a generation of a model performed in the monitoring device according to the first embodiment of the present invention;

FIG. 10 is a diagram for explaining an operation of a camera control unit of the monitoring device according to the second embodiment of the present invention;

DESCRIPTION OF THE PREFERRED EMBODIMENTS

Figure 1:
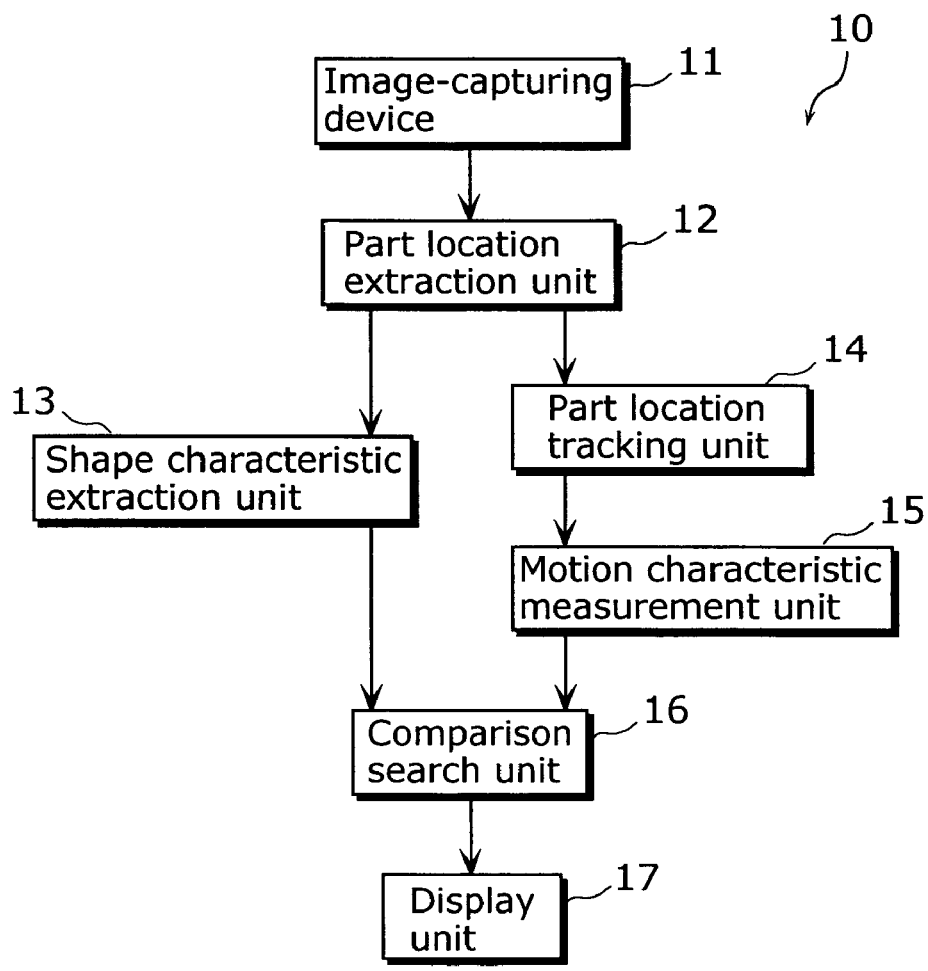
FIG. 1 is a block diagram showing a structure of a conventional monitoring device.

In order to overcome the object, a monitoring device according to embodiments of the present invention is a monitoring device which monitors a region to be monitored, the device including: an image-capturing unit which captures an image within the monitored region, and generates an overall image; a moving object image generation unit which generates, from the overall image generated by the image-capturing unit, a moving object image that is an image of moving objects or of a crowd; and a density calculation unit which calculates, based on the moving object image generated by the moving object image generation unit, a degree of density of the moving objects or of the crowd, as a density that is parameterized by a function approximation or a frequency transformation.

According to this structure, a density of moving objects or of a crowd in an overall image can be calculated even in the case where a part such as a person's face cannot be detected precisely, by detecting and tracking the image of moving objects or of the crowd in the overall image not at an individual level but at a macro level.

Further, the monitoring device is preferred to further include a situation determination unit which determines a situation at a current time, based on the density at the current time calculated by the density calculation unit and a reference density which is a degree of density to be the basis for determining the situation.

According to this structure, a detection miss, a tracking miss and a matching miss can be prevented from occurring by determining a current situation as an abnormal state in the case where the density of the moving objects or of the crowd is greatly different from that in the normal state.

Also, the monitoring device is preferred to further include: a reference density calculation unit which calculates the reference density based on the density at a predetermined date and time calculated by the density calculation unit; and a database in which the reference density calculated by the reference density calculation unit is stored.

According to this structure, the density of the moving objects or of the crowd in the normal state can be calculated.

Further, the reference density calculation unit may calculate a new reference density for each predetermined time based on the density calculated by the density calculation unit, and update the reference density stored in the database to the calculated new reference density.

Accordingly to this structure, the reference density stored in the database is updated at every predetermined time so that more correct determination of an abnormal state is realized.

Also, the reference density calculation unit may calculate the reference density for at least one of each season, time, weather condition and day of the week, and store the calculated reference density into the database.

Accordingly to this structure, a reference density for each season, time, weather condition or day of the week is calculated and stored in a database so that a more correct determination of the abnormal state is realized.

Also, the density calculation unit and the reference density calculation unit may respectively parameterize the density and the reference density by the function approximation.

Further, the density calculation unit and the reference density calculation unit may respectively parameterize the density and the reference density using, as parameters, the number of distributions of Gaussian distributions, and a mean value and a variance value of each Gaussian distribution.

According to this structure, a determination of an abnormal state can be made robust to noise and detection miss by describing the directions using parameters.

Further, the monitoring device may further include a database in which the reference density that is previously defined is stored.

According to this structure, the structure can be simplified by previously setting the reference density and holding the reference density.

Further, the situation determination unit may compare between the density at the current time and the reference density, and determine that the situation at the current time is in an abnormal state in the case where a difference between the density at the current time and the reference density is greater than or equal to a predetermined threshold.

According to this structure, a detection miss, a tracking miss and a matching miss can be prevented by determining a current state as an abnormal state in the case where the density of the moving objects or of the crowd greatly differs from that in the normal state.

Further, the monitoring device may further include a notification unit which notifies the situation at the current time determined by the situation determination unit.

According to this structure, a detection miss, a tracking miss and a matching miss can be prevented and an attention can be brought to a surveillant by determining a current state as an abnormal state in the case where the density of the moving objects or of the crowd greatly differs from that in the normal state.

Further, the moving object image generation unit may generate the moving object image by performing inter-frame differential processing or background differential processing on the overall image.

According to this structure, a moving object image can be easily generated.

Further, the density calculation unit may detect a head part candidate region from the overall image, and calculate the density based on an area of the detected head part candidate region in the overall image.

According to this structure, a density of the moving objects or of the crowd can be easily calculated.

Further, the density calculation unit may calculate the density based on an area of the moving object image.

According to this structure, a density of the moving objects or of the crowd can be easily calculated.

Further, the density calculation unit may transform the moving object image into one-dimensional information, and calculate the density based on the transformed one-dimensional information.

According to this structure, a density of the moving objects or of the crowd can be easily calculated.

Further, the density calculation unit may calculate the density by performing frequency analysis on the one-dimensional information.

According to this structure, a density of the moving objects or of the crowd can be more easily calculated.

Further, the image-capturing unit is an infrared camera, and the density calculation unit may calculate the density based on a region in which the infrared camera responds.

According to this structure, a density of the moving objects or of the crowd can be easily calculated.

Further, a monitoring device according to the embodiments of the present invention is a monitoring device which monitors a region to be monitored, the device including: an image-capturing unit which captures an image within the monitored region, and generates an overall image; a moving object image generation unit which generates, from the overall image generated by the image-capturing unit, a moving object image that is an image of moving objects or of a crowd; a density calculation unit which calculates, based on the moving object image generated by the moving object image generation unit, a density indicating a degree of density of the moving objects or of the crowd; and a situation judgment unit which compares between the density at a current time calculated by the density calculation unit and a reference density which is a degree of density to be the basis for determining a situation, and determines that the situation at the current time is in an abnormal state in the case where a difference between the density at the current time and the reference density is greater than or equal to a predetermined threshold; another image-capturing unit having at least one of functions of pan, tilt, and zoom; and an image-capturing control unit which controls the another image-capturing unit so that the another image-capturing unit captures a region in which the density at the current time differs from the reference density, in the case where the situation determination unit determines that the situation at the current time is in the abnormal state.

According to this structure, a detailed image can be obtained by causing another image-capturing unit to capture an image of a region in which an abnormal state is occurring, based on the determination result of the abnormal state.

Further, the monitoring device according to the embodiments of the present invention is a monitoring device which monitors a region to be monitored, the device including: an image-capturing unit which captures an image within the monitored region, and generates an overall image; a moving object image generation unit which generates, from the overall image generated by the image-capturing unit, a moving object image that is an image of moving objects or of a crowd; a density calculation unit which calculates, based on the moving object image generated by the moving object image generation unit, a density indicating a degree of density of the moving objects or of the crowd; and a moving direction calculation unit which calculates a moving direction of the moving objects or of the crowd, based on the overall image generated by the image-capturing unit and the density calculated by the density calculation unit.

According to this structure, a moving direction of the moving objects or of the crowd can be calculated in the case where a part such as a person's face cannot be detected precisely, by detecting and tracking the image of the moving objects or of the crowd in the overall image not at an individual level but at a macro level.

Further, the monitoring device may further include a situation determination unit which determines a situation at a current time based on the moving direction at the current time calculated by the moving direction calculation unit and a reference moving direction that is a moving direction to be the basis for determining the situation.

According to this structure, a current state can be determined as an abnormal state in the case where the moving direction of the moving objects or of the crowd is different from that in the normal state.

Further, the monitoring device may further include a reference moving direction calculation unit which calculates the reference moving direction based on the moving direction on a predetermined date and time calculated by the moving direction calculation unit; and a database in which the reference moving direction calculated by the reference moving direction calculation unit is stored.

According to this structure, a moving direction in the normal state can be calculated.

Further, the reference moving direction calculation unit may calculate a new reference moving direction for each predetermined time based on the moving direction calculated by the moving direction calculation unit, and update the reference moving direction stored in the database to the calculated new reference moving direction.

According to this structure, a more precise determination of an abnormal state can be achieved by updating the reference moving direction stored in the database by every predetermined time.

Further, the reference moving direction calculation unit may calculate the reference moving direction for at least one of each season, time, weather condition and day of the week, and store the calculated reference moving direction into the database.

According to this structure, a more precise determination of an abnormal state can be achieved by arithmetically operating a reference moving direction for each season, time, weather condition, or day of the week.

Further, the moving direction calculation unit and the reference moving direction calculation unit may respectively parameterize the moving direction and the reference moving direction by the function approximation.

In addition, the moving direction calculation unit and the reference moving direction calculation unit may respectively parameterize the moving direction and the reference moving direction using, as parameters, the number of distributions of Gaussian distributions, and a mean value and a variance value of each Gaussian distribution.

According to this structure, a determination of an abnormal state can be made robust to noise and detection miss by describing the directions using parameters.

Further, the monitoring device may further include a database in which the reference moving direction that is previously defined is stored.

According to this structure, the structure can be simplified by previously setting and storing the reference moving direction. Further, the situation determination unit may compare between the moving direction at the current time and the reference moving direction, and determine that the situation at the current time is in an abnormal state in the case where a difference between the moving direction at the current time and the reference moving direction is greater than or equal to a predetermined threshold.

According to this structure, a detection miss, a tracking miss and a matching miss can be prevented from occurring by determining that a current state is in an abnormal state in the case where the moving direction of the moving objects or of the crowd are greatly different from that in the normal state.

Further, the monitoring device may further include another image-capturing unit having at least one of functions of pan, tilt, and zoom; and an image-capturing control unit which controls the another image-capturing unit so that the another image-capturing unit captures a region in which the moving direction at the current time differs from the reference moving direction, in the case where the situation determination unit determines that the situation at the current time is in the abnormal state.

According to this structure, a detailed image can be obtained by causing another image-capturing unit to capture an image of a region in which an abnormal state is occurring, based on the determination result of the abnormal state.

Further, the image-capturing control unit may control the another image-capturing unit so that the another image-capturing unit may capture a region in which the moving direction at the current time is different from the reference moving direction and a region in which the density has a peak value, in the case where the situation determination unit determines that the situation at the current time is in the abnormal state.

According to this structure, an image of a region in which an abnormal state is occurring can be precisely captured by another image-capturing unit.

In addition, the present invention can be not only realized as such monitoring device, but also as a monitoring method including characteristic units of such monitoring device as steps, or as a program for causing a computer to execute those steps.

Furthermore, it is obvious that such program can be distributed via a recording medium such as a CD-ROM or a transmission medium such as the Internet.

The embodiments of the present invention are described hereinafter with reference to drawings.

First Embodiment

Figure 2:
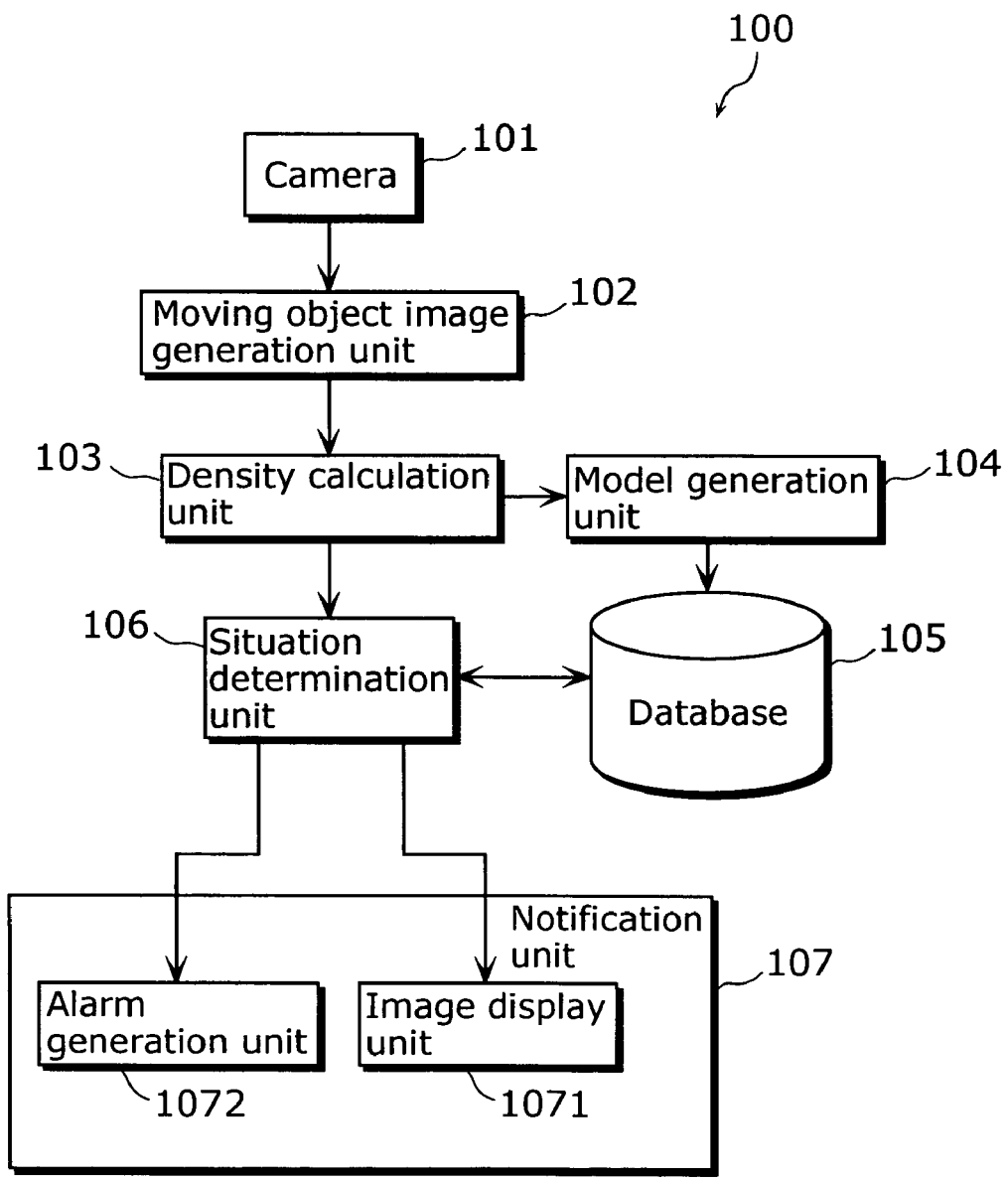
FIG. 2 is a block diagram showing a structure of a monitoring device according to a first embodiment of the present invention.

FIG. 2 is a block diagram showing a structure of a monitoring device according to the first embodiment of the present invention. As shown in FIG. 2, a monitoring device 100 according to the first embodiment of the present invention is a device which monitors moving objects such as persons and vehicles or a crowd, and includes a camera (an image-capturing unit) 101, a moving object image generation unit 102, a density calculation unit 103, a model generation unit 104, a database 105, a situation determination unit 106 and a notification unit 107. The notification unit 107 includes an image display unit 1071 and an alarm generation unit 1072.

The camera 101 captures an image of objects including moving objects or a crowd that are moving within a monitored region, and generates an overall image. The moving object image generation unit 102 receives the overall image on a frame-by-frame basis which is captured by the camera 101, and performs inter-frame differential processing on the overall image or background differential processing between the overall image and a background image that has been previously prepared. Here, the image on which differential processing is performed by the moving object image generation unit 102 is a moving object image that is moving in which moving objects or a crowd such as vehicles which are traveling is specified. At this time, the moving object image generation unit 102 may perform, in the case where an edge of an image which captured a moving object or a crowd in the input image is reliably extracted, edge extraction processing on each input image without performing differential processing. It is explained hereinafter about the case where the moving object image generation unit 102 performs inter-frame differential processing or background differential processing.

The density calculation unit 103 transforms the image (the moving object image) on which differential processing is performed by the moving object image generation unit 102 into one-dimensional information, performs frequency analysis on the one-dimensional information, and calculates a density which is a degree of density of the moving objects or of the crowd.

Figure 3:
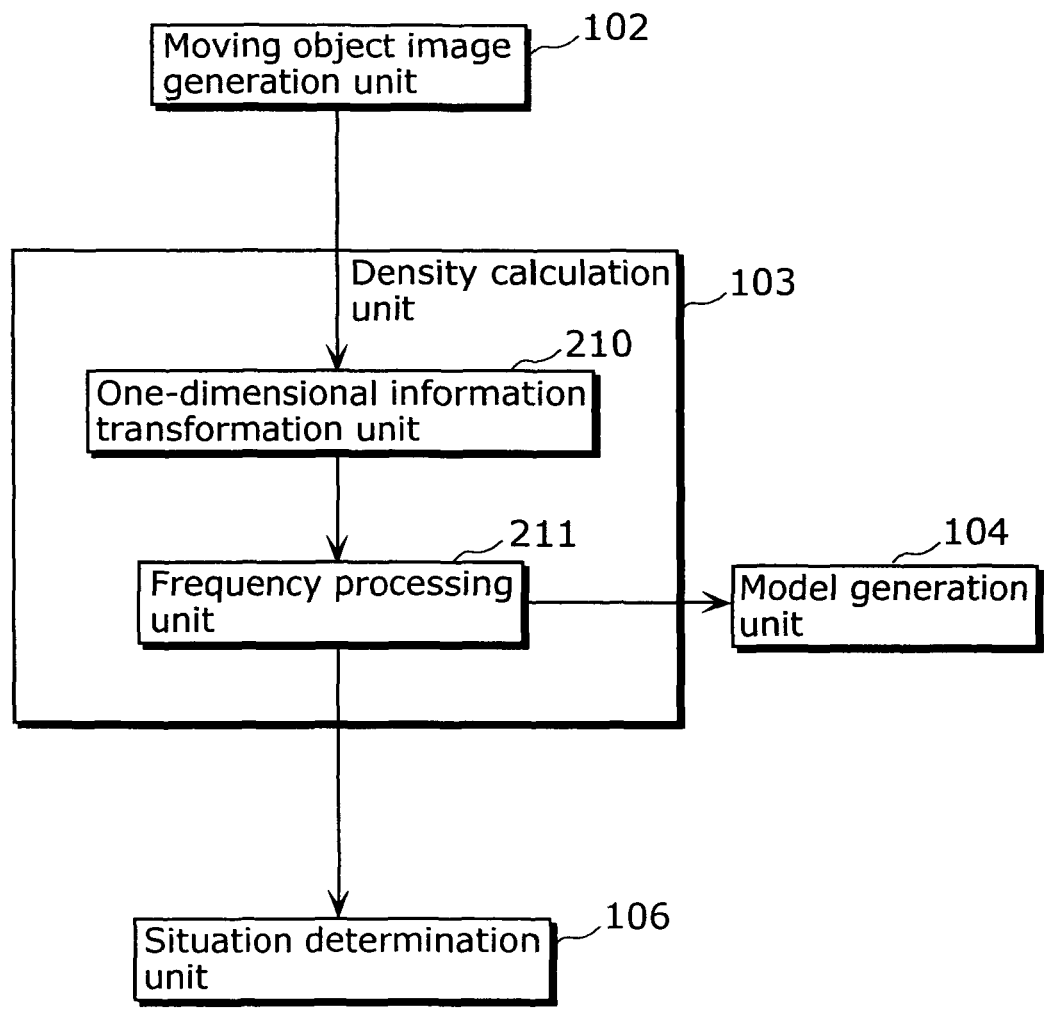
FIG. 3 is a block diagram showing a density calculation unit of the monitoring device according to the first embodiment of the present invention.

Next, the density calculation unit 103 is described in detail with reference to FIG. 3.

The density calculation unit 103 has a one-dimensional information transformation unit 210 and a frequency processing unit 211. The one-dimensional information transformation unit 210 transforms a two-dimensional image outputted by the moving object image generation unit 102 into one-dimensional information. The following is two examples of image transformation operations to be performed by the one-dimensional information transformation unit 210.

Figure 4:
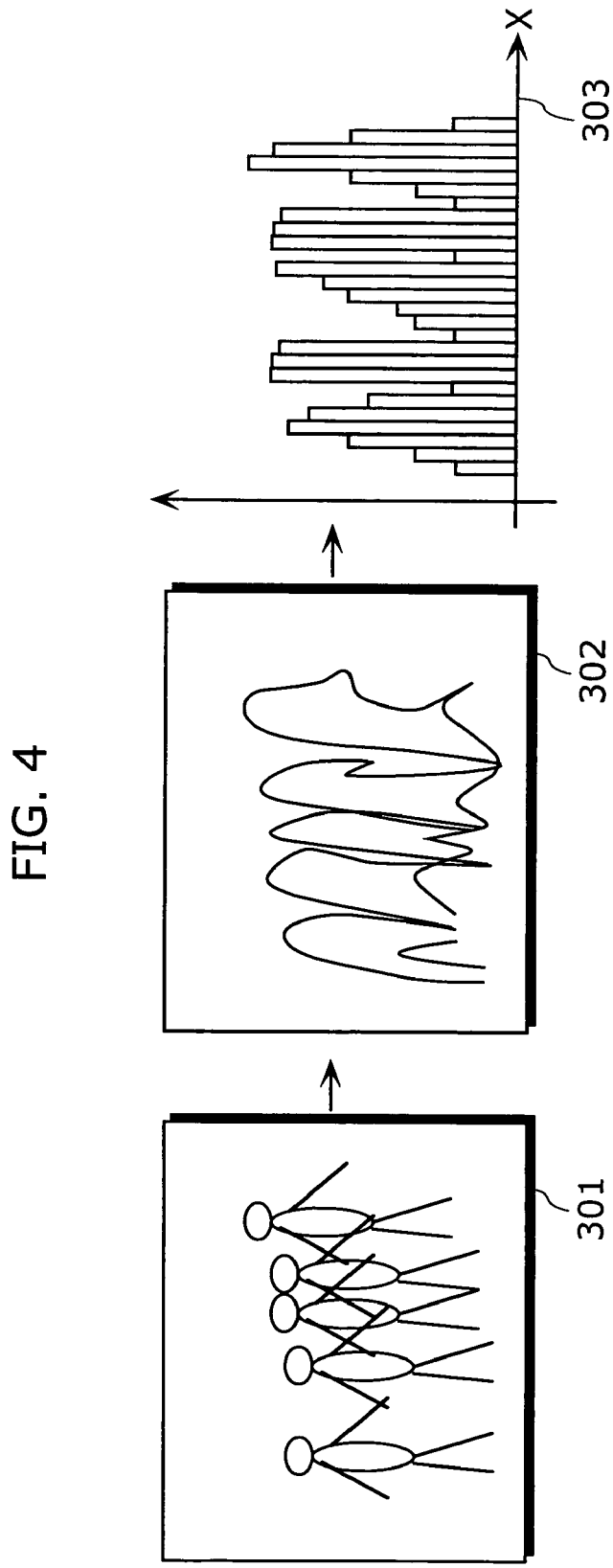
FIG. 4 is a diagram for explaining a one-dimensional information transformation performed in the monitoring device according to the first embodiment of the present invention.

As shown in FIG. 4, the first example of the image transformation operation is described as follows. The moving object image generation unit 102 performs differential processing on an input image (an overall image) 301. The processed image is projected to a horizontal axis based on a differential value of a differential image 302 inputted to the density calculation unit 103 so as to calculate a histogram 303. Consequently, the histogram 303 that is one-dimensional information of respective values on the horizontal axis can be obtained.

Figure 5:
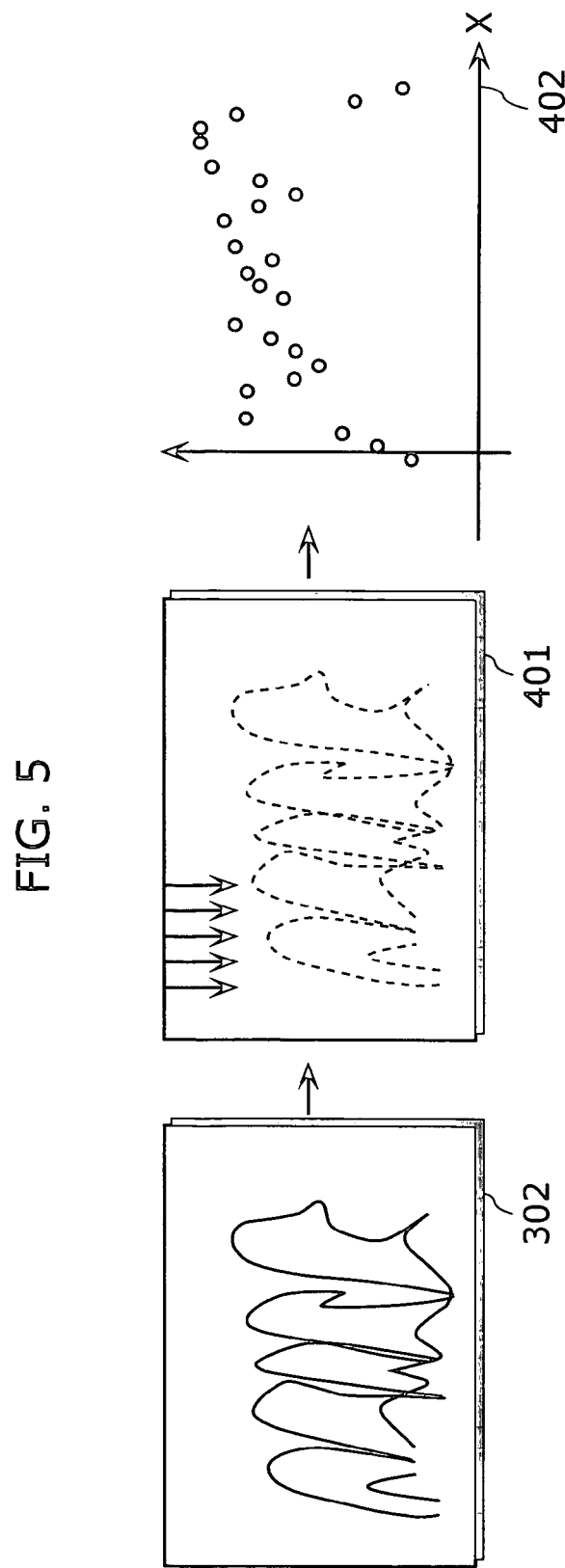
FIG. 5 is another diagram for explaining the one-dimensional information transformation performed in the monitoring device according to the first embodiment of the present invention.

As shown in FIG. 5, the other example of the image transformation operation is described as follows. A binarized image 401 is generated by binarizing the differential value of the inputted differential picture 302 into values of "0" or "1". One-dimensional information is then obtained by scanning the binarized image 401 in a direction of a vertical axis from a top part of the image and remaining a detected vertical axis value 402 that is the maximum value on the vertical axis of a firstly detected on-pixel in the scanning. Here, the on-pixel is a binarized pixel having the value of "1". For example, in the case where the binarized image 401 is shown by X and Y axes having an origin point on the bottom left in the X-Y coordinate, if a specific value on the X axis has plural on-pixels of "200", "100" and "50" on the Y axis that is the vertical axis, the value "200" is assigned to a value on the Y axis to be detected as the detected vertical axis value 402 because it is the value of an on-pixel on the Y axis firstly detected when the image is scanned from the top part of the image.

It should be noted that a method for obtaining such one-dimensional information is not only limited to the above, but any methods for obtaining one-dimensional information from which a density of the crowd can be calculated is applicable.

Here, the histogram 303 and the vertical axis detected value 402 of the on-pixel may be used as the density of the crowd. In this case, the frequency processing unit 211 is not necessary. However, in the present embodiment, it is further explained about an example where the frequency processing unit 211 performs frequency processing on the histogram 303 and the detected vertical axis value 402 that are pieces of the one-dimensional information, as an example for increasing a robust characteristic against noises.

Figure 6:
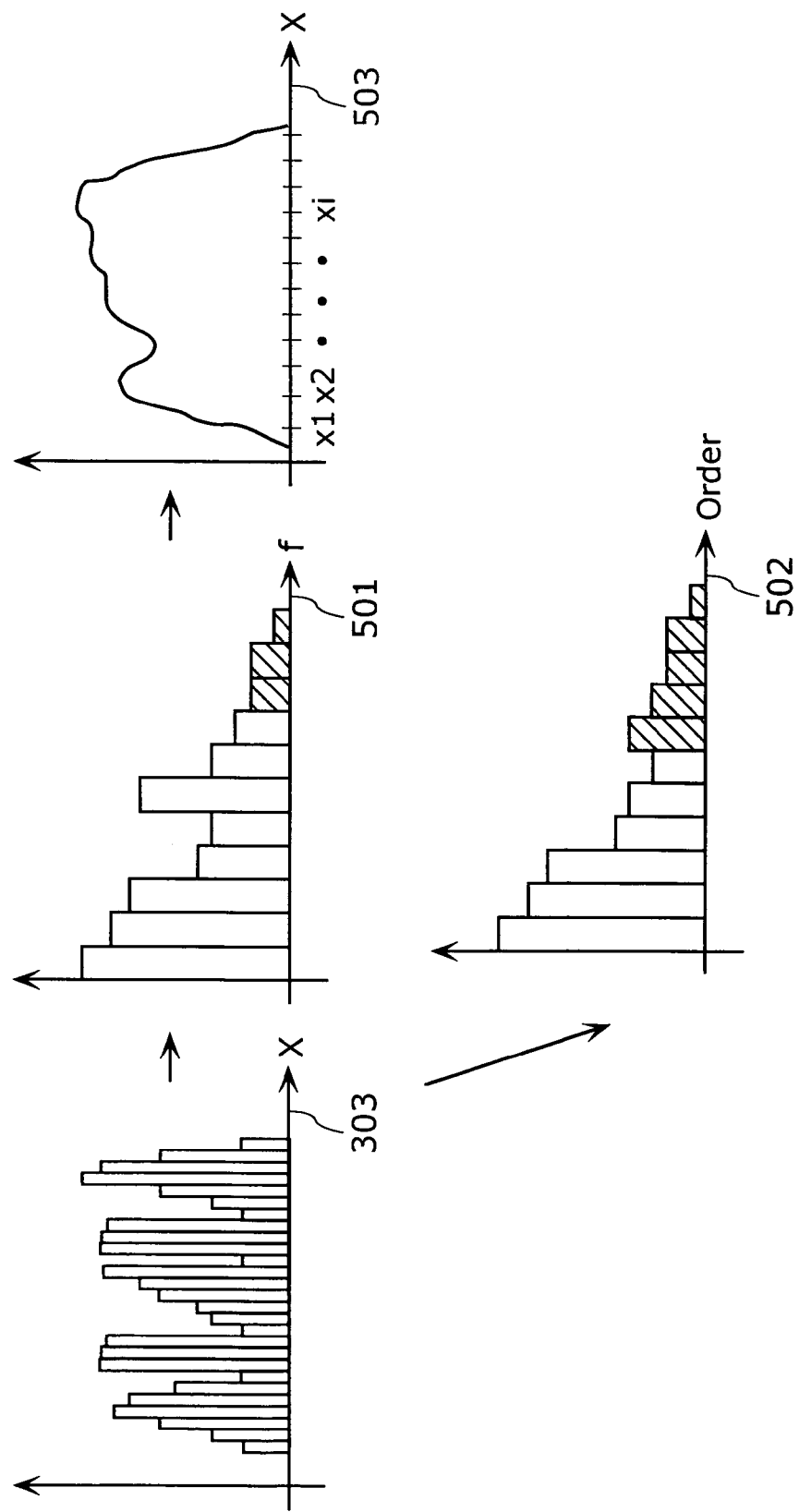
FIG. 6 is a diagram for explaining a low-pass processing performed in the monitoring device according to the first embodiment of the present invention.

The histogram 303 or the detected vertical axis value 402 that are the pieces of one-dimensional information generated by the one-dimensional information transformation unit 210 is sent to the frequency processing unit 211. The frequency processing unit 211 performs one-dimensional Fourier transformation on the histogram 303 or the detected vertical value 402 that are the pieces of one-dimensional information. Consequently, a frequency spectrum 501 of the histogram 303 or the detected vertical axis value 402 that are the pieces of one-dimensional information can be calculated as shown in FIG. 6. Here, there is a case where the histogram 303 that is the piece of the one-dimensional information processed by the one-dimensional information transformation unit 210 includes high-frequency components as shown in a hatching portion of the frequency spectrum 501 shown in FIG. 6.

The monitoring device 100 aims at capturing moving objects or a crowd at a macro level so that it determines that the high frequency components are noise; performs Fourier transformation on the histogram 303 that is the piece of the one-dimensional information; calculates frequency components; cuts high-frequency components from the calculated frequency components; performs inverse Fourier transformation; and obtains an inverse transformation result 503. In the present embodiment, the inverse transformation result 503 is referred to as frequency analysis processed one-dimensional information. In other words, the monitoring device 100 can capture the moving objects or the crowd at a macro level by performing low-pass processing. Here, the inverse Fourier transformation is not necessarily to be performed so as to transform the frequency components back to the image of pixel values. The monitoring device 100 thus can calculate frequency analysis processed one-dimensional information using a frequency spectrum 501 and a cepstrum 502 used for a speech recognition and the like. Note that, with respect to the calculation of the cepstrum 502, the monitoring device 100 can calculate a logarithmic spectrum after performing the one-dimensional Fourier transformation on the logarithmic spectrum, calculate a cepstrum coefficient by performing another Fourier transformation, and calculate frequency analysis processed one-dimensional information only using components of low-ordered terms.

Here, compared with the one-dimensional information calculated by the one-dimensional information transformation unit 210, frequency analysis processed one-dimensional information on which frequency analysis processing such as cepstrum coefficient calculation processing is performed by the frequency processing unit 211 is defined as a density of plural moving objects or of the crowd that are moving.

It is obvious that the histogram 303 and the vertical axis detected value of the on-pixel is also one-dimensional information that is similar to the frequency analysis processed one-dimensional information. Therefore, it can be defined as a density of the plural moving objects or of the crowd that are moving.

Next, it is explained about the operation of generating a reference density (a model value) performed by the model generation unit 104. Here, the reference density is a density of the moving objects or of the crowd generated from the overall image in a normal state and is one-dimensional information that becomes a reference for determining an occurrence of an abnormal state.

As a method of generating a model which is a reference density, the histogram 303 and the vertical axis detected value 402 of the on-pixel can be used. In addition, the frequency processing unit 211 utilizes a method of using an inverse transformation result 503 obtained by low-pass processing the histogram 303 which is the one-dimensional information as shown in FIG. 6 and a method of using a Fourier spectrum or a cepstrum coefficient. The method of using the inverse transformation result 503 obtained by which the one-dimensional information is processed with a low-pass filter is described hereinafter. Note that, even in the method of generating a model using the Fourier spectrum or the cepstrum coefficient, the model can be generated using the same method as the method of using the inverse transformation result 503.

The model generation unit 104 serves as a reference density calculation unit which calculates a reference density (a model value) of the moving objects or a crowd based on the frequency analysis processed one-dimensional information (a density) at a predetermined date and time calculated by the frequency processing unit 211. The model generation unit 104 stores the arithmetically processed reference density into the database 105 so that the given density is being held in the database 105.

The model generation unit 104 can arithmetically process a reference density for each season, time, weather or day of the week. It can also prepare plural reference densities in consideration of a season and a time.

Also, since it is considered that the number of persons and the like are changeable depending on weather conditions, it is desired to prepare reference densities for respective weather conditions. Further, in the case of an outdoor on a rainy day, there will be a person who uses an umbrella so that the frequency analysis processed one-dimensional information (a density) also differs for a sunny day or a cloudy day. Also, since it is considered that the number of persons and the like are similarly changeable depending on days of a week such as in the case of a weekday or a weekend, it is desired to prepare reference densities for respective days of the week. In addition, such reference densities are generated so as to be associated with information relating to each weather, time, weather condition or day of the week, and one of the reference densities can be determined according to a current season, time, weather condition or day of the week while being monitored.

FIGS. 7A, 7B and 7C are diagrams showing modeled examples based on seasons, time, weather conditions and days of a week. As shown in FIGS. 7A, 7B and 7C, one of reference densities (a model value) out of a model 1, a model 2, a model 3 and the like is previously determined according to a current season, time, weather and day of the week. Accordingly, a more detailed modeling relating to the moving objects or the crowd can be performed. It should be noted that the modeling is not necessarily performed based on all of the season, time, weather condition and day of the week. The modeling thus may be performed, for example, only based on the time. Such reference density (the model value) is held in the database 105.

Here, it is explained about an example of an arithmetic processing of the reference density performed by the model generation unit 104 in the case of using the inverse transformation result 503 as frequency analyzed one-dimensional information (a density). The similar processing can be performed using the histogram 303 and the vertical axis detection value 402 of the on-pixel in place of the inverse transformation result 503.

The inverse transformation result 503 has a value y(xi) for each point xi on the x axis. Here, a reference density (a model value) is calculated by modeling the time variation of y(xi) that is the inverse transformation result at each point xi. In specific, as shown in FIG. 7D, the time variation of y(xi) for each point xi on the x axis can be modeled by obtaining a mean value and a variance value for a value that is the time variation of y(xi). That is, the reference density (the model value) has a mean value and a variance value of f(xi) for each xi.

Through modeling, the variance value becomes larger when the density variation is greater depending on a day of the week, date and time. Also, in the case where the density variation is small and there are few persons, both of the mean value and the variance value become smaller values. Therefore, the density in a normal state can be modeled in consideration with time variations. Further, the variance value and the mean value can be updated sequentially as the reference density.

Also, in the case of using the Fourier spectrum and the cepstrum coefficient, the modeling can be performed using time variations of a spectrum value and a cepstrum value of each frequency or each cepstrum order.

For example, in the case of using the Fourier cepstrum, the time variation of g(fi) can be modeled using the mean value and the variance value as described above since there is a power spectrum value g(fi) corresponding to each frequency fi.

Here, the database 105 holds, as the reference density (the model value), a mean value and a variance value presenting the time variation of y(xi) and g(fi) at each point on the x axis, each frequency, or at each cepstrum order.

It should be noted that, in order to adapt to the case where the distribution of moving objects such as a traffic is changed according to an environmental change, the model generation unit 104 may obtain a new reference density (the model value) by arithmetically processing the reference density (the model value) for each predetermined period of time, store the value into the database 105, and update the reference density (the model value).

Next, it is described about the situation determination unit 106. The situation determination unit 106 selects a reference density (a model value) stored in the database 105 based on information such as a current season, time, weather condition or day of the week, determines whether or not the density at the current time is different from the reference density by comparing the selected reference density and the density (one-dimensional information) at the current time inputted from the density calculation unit 103, generates a determination result, and sends the result to the notification unit 107.

In the comparison between the density at the current time and the reference density, the situation determination unit 106 calculates a degree of deviation from the mean value and variance value σ of the reference density (model value).

Here, for the judgment of an occurrence of abnormal situation, a histogram that is one-dimensional information is generated from the inputted image, and y(xi) and g(fi) of each frequency, each cepstrum order or each point on the x-axis are calculated using the frequency analysis processed one-dimensional information as a density at a current time. Next, the number of points xi whose y(xi) and g(fi) are Nσ (N is a constant) or greater is determined based on the variance value σ of the reference density (the model value). When the number of points equals to the threshold or more, the situation can be determined as an abnormal state. It should be noted that weighting coefficients may be multiplied for each point xi as a comparison method.

Next, it is described about the notification unit 107. The notification unit 107 has an image display unit 1071 and an alarm generation unit 1072.

The image display unit 1071 receives and displays the determination result from the situation determination unit 106, and notifies the surveillant of the determination result. The alarm generation unit 1072 generates an alarm sound or an alarm light when the determination result indicates an occurrence of an abnormal state in response to the determination result from the situation determination unit 106, and notifies the surveillant of the occurrence of the abnormal state.

Figure 8:
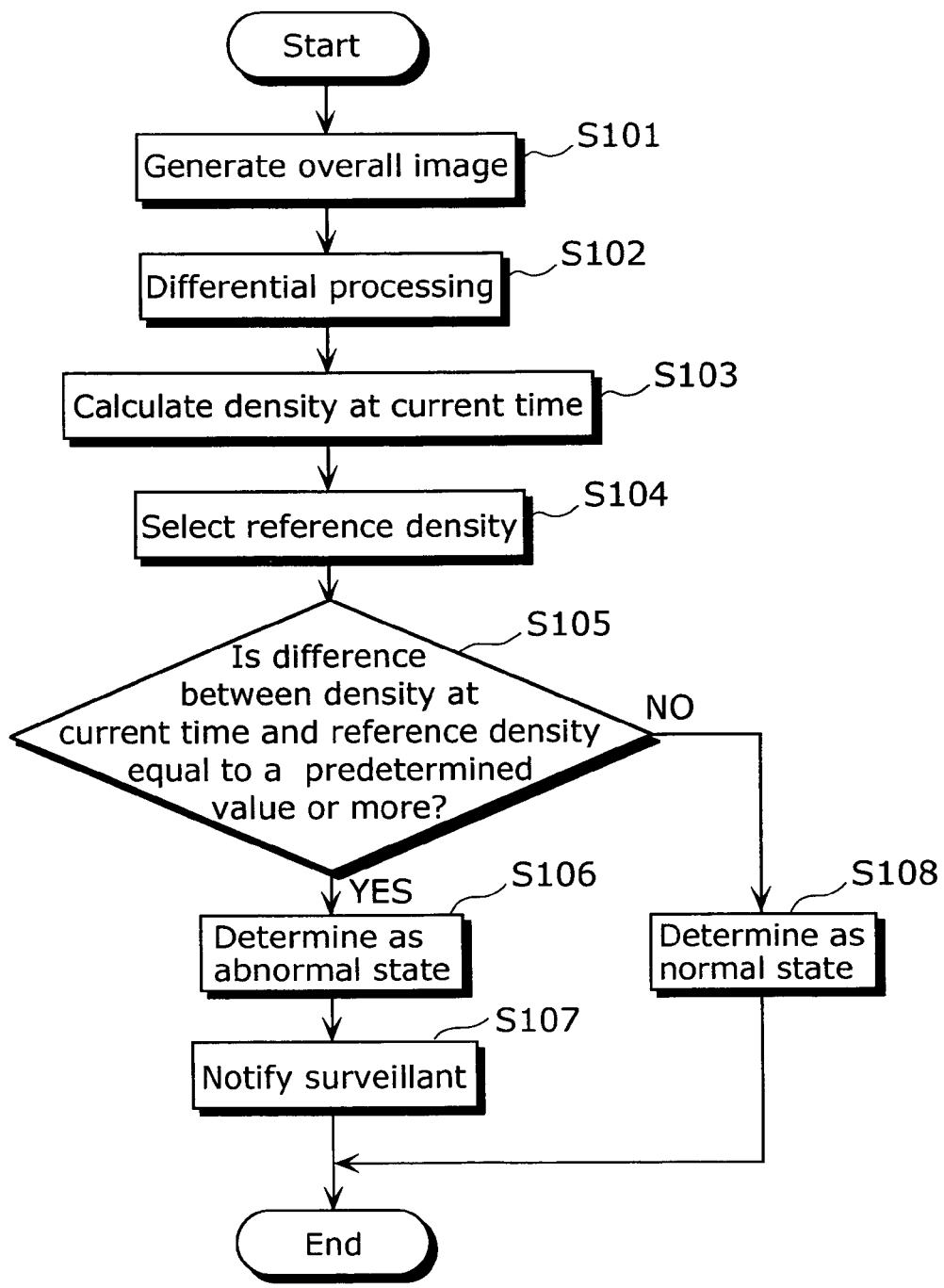
FIG. 8 is a flowchart showing a flow of operations performed by the monitoring device according to the first embodiment of the present invention.

Next, it is explained about the operation of the monitoring device 100 structured as described above. FIG. 8 is a flowchart showing a flow of operations performed by the monitoring device 100. Here, it is assumed that plural reference densities calculated according to, for example, a season, a weather condition, a time and a day of the week by the model generation unit 104 have been stored previously in the database 105.

The camera 101 captures an image of objects that are moving in a monitored region including plural moving objects or a crowd, and generates an overall image (Step S101). The moving object image generation unit 102 receives the overall image captured by the camera 101 on a frame-by-frame basis, and performs inter-frame differential processing on the overall image or a background differential processing between the overall image and a background image that has been prepared (Step S102). Next, the density calculation unit 103 transforms the image (the moving object image) on which the differential processing is performed by the moving object image generation unit 102 into one-dimensional information, and calculates a density at a current time through frequency analysis (Step S103). The situation determination unit 106 selects a reference density corresponding to a current season, time, weather condition and day of the week from among the plural reference densities held in the database 105 (Step S104). The situation determination unit 106 then determines a situation at the current time based on the selected reference density and the density at the current time calculated by the density calculation unit 103. That is, the situation determination unit 106 determines whether or not the density at the current time is apart for a predetermined value or more from the mean value and the variance value σ of the reference density (Step S105). As the result of the determination, when the density is apart for a predetermined value or more (YES in Step S105), it is determined that the situation at the current time is in an abnormal state (Step S106). The alarm generation unit 1072 then receives and notifies the determination result as an abnormal state from the situation determination unit 106 to the surveillant by generating an alarm sound or an alarm light (Step S107). On the other hand, when the determination result states that the density is within the predetermined value (NO in Step S105), it is judged that the situation at the current time is in a normal state (Step S108).

As described above, according to the first embodiment of the present invention, even in the case where a part such as a person's face cannot be detected precisely, a detection miss, a tracking miss and a matching miss can be prevented from occurring and attention is brought to the surveillant by determining that the current state is in an abnormal state in the case where the density of the moving objects or of the crowd is greatly different from that in the normal state, by not separately detecting and tracking the moving objects in the overall image or the image of the crowd at an individual level but at a macro level. In addition, the calculation of the density of the moving objects or the crowd is easily realized according to the first embodiment of the present invention.

Second Embodiment

Figure 9:
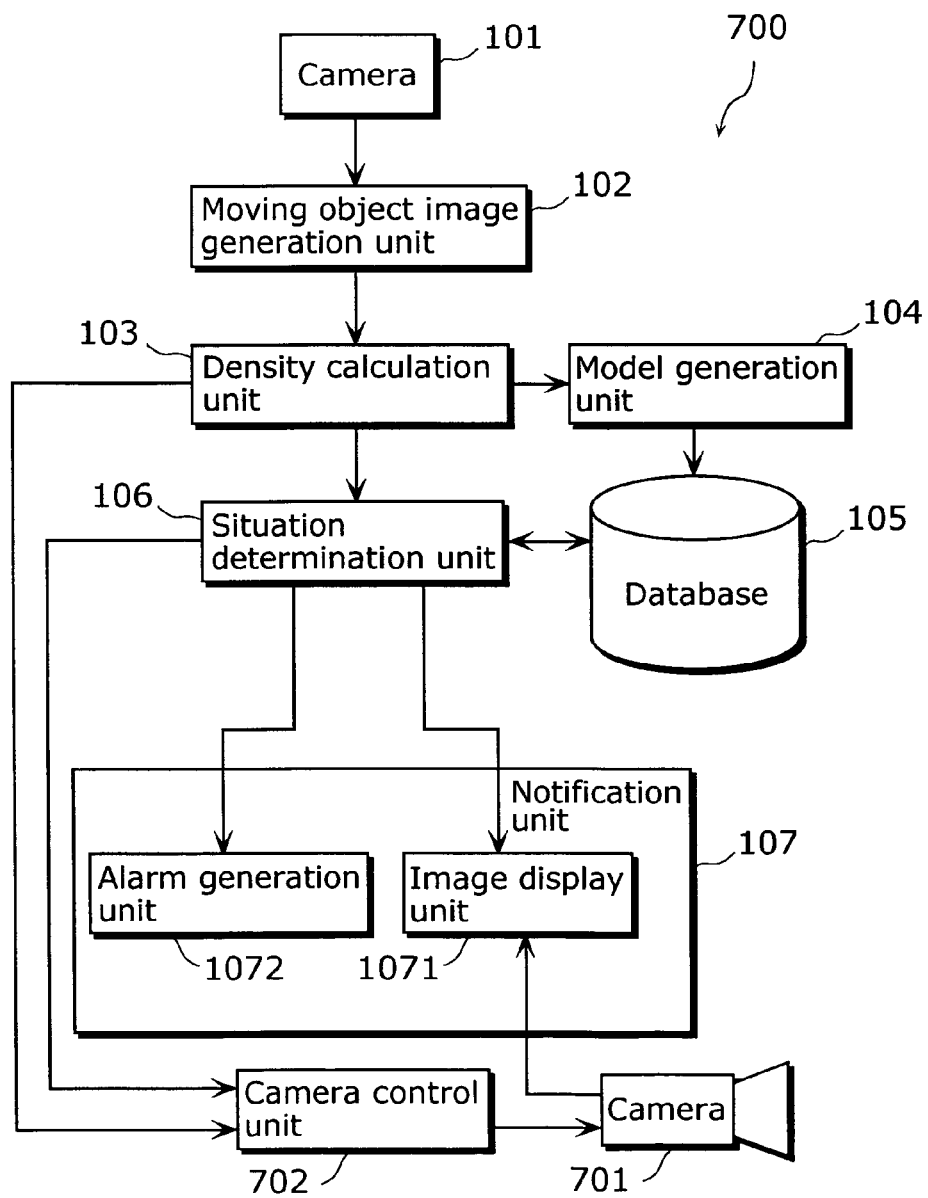
FIG. 9 is a block diagram showing a structure of a monitoring device according to a second embodiment of the present invention.

Next, the second embodiment of the present invention is explained with reference to drawings. FIG. 9 is a block diagram showing a structure of a monitoring device according to the second embodiment of the present invention. It should be noted that, in the second embodiment, same reference numbers are attached to constituents same as in the first embodiment and the explanations of the same constituents are omitted hereinafter.

As shown in FIG. 9, a monitoring device 700 according to the second embodiment of the present invention includes a camera 701 and a camera control unit 702 in addition to the constituents of the first embodiment.

The camera 701 has at least one of functions of pan, tilt and zoom. The density calculation unit 103 provides frequency analysis processed one-dimensional information (a density) to the camera control unit 702. Also, the situation determination unit 106 provides a determination result to the camera control unit 702. The camera control unit 702 is explained with reference to FIGS. 10. FIG. 10A shows an image example 1201 in a normal state. FIG. 10B shows an image example 1202 in which an abnormal state is occurring. FIG. 10C is an example 1203 in the case where mean value of the reference density is plotted. FIG. 10D is a diagram showing a density 1204 in which the abnormal state is occurring. It should be noted that the reference density shown in FIG. 10C has variance values of respective f(xi). Here, in the case where the situation determination unit 106 determines that an abnormal state is occurring, the camera control unit 702 controls the camera 701 so that the camera 701 faces toward a direction of a region where the one-dimensional information (the density) from the density calculation unit 103 is the most different from the reference density. At this time, an image captured by the camera 701 is provided and displayed to the image display unit 1071.

For example, in the case where a person falls down in a normal state as shown in FIG. 10A and an abnormal state as shown in FIG. 10B occurs and the situation determination unit 106 determines that an abnormal state is occurring, the camera control unit 702 controls the camera 701 so that the camera 701 faces toward a region where the density 1204 at a current time as shown in FIG. 10D is the most different from the reference density. Consequently, a region in which the person has been falling down shown in FIG. 10B can be captured by the camera 701.

Also, the camera control unit 702 can control the camera so that the camera faces toward a region in which the frequency analysis processed one-dimensional information (the density) has its peak value.

As described in the above, according to the second embodiment of the present invention, a more detailed image can be obtained by which the camera 701 captures a region where an abnormal state is occurring based on a determination result as the abnormal state, in addition to the effects of the first embodiment of the present invention.

Third Embodiment

Figure 11:
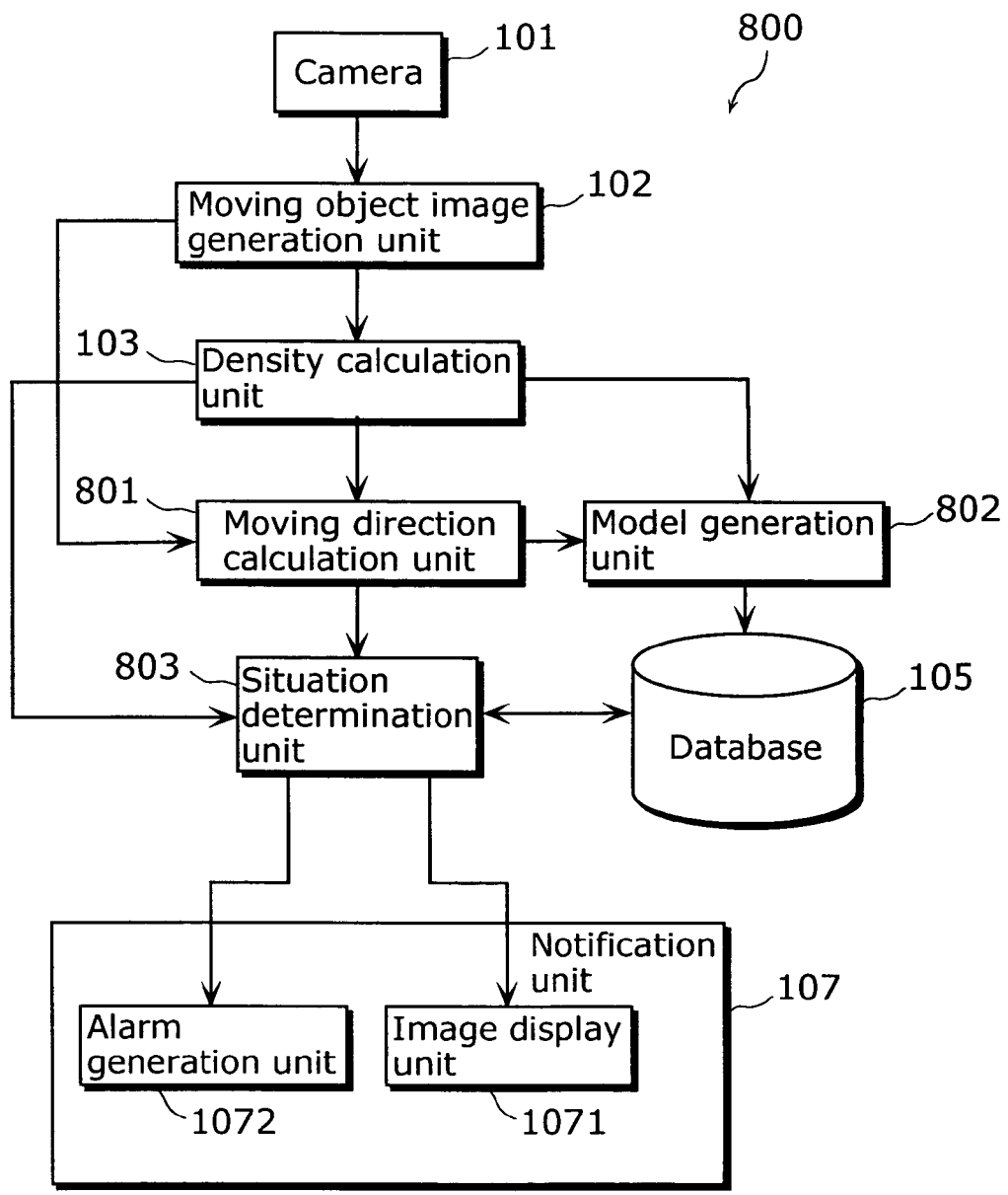
FIG. 11 is a block diagram showing a structure of a monitoring device according to a third embodiment of the present invention.

Next, the third embodiment of the present invention is explained with reference to drawings. FIG. 11 is a block diagram showing a structure of a monitoring device according to the third embodiment of the present invention. It should be noted that, in the third embodiment, same reference numbers are attached to constituents same as in the first embodiment and the explanations of the same constituents are omitted hereinafter.

As shown in FIG. 11, a monitoring device 800 according to the third embodiment of the present invention adds a moving direction calculation unit 801 in addition to the constituents of the first embodiment of the present invention, and includes a model generation unit 802 and a situation determination unit 803 in place of the model generation unit 104 and the situation determination unit 106.

The moving direction calculation unit 801 receives an image on which differential processing is performed by the moving object image generation unit 102 as well as the frequency analysis processed one-dimensional information on which frequency analysis processing is performed on a frame-by-frame basis by the frequency processing unit 211 of the density calculation unit 103.

It is explained hereinafter about the case where the moving direction calculation unit 801 uses, as an input, an inverse transformation result 503 obtained by performing low-pass processing on a frame-by-frame basis by the frequency processing unit 211 shown in FIG. 6.

Figure 12:
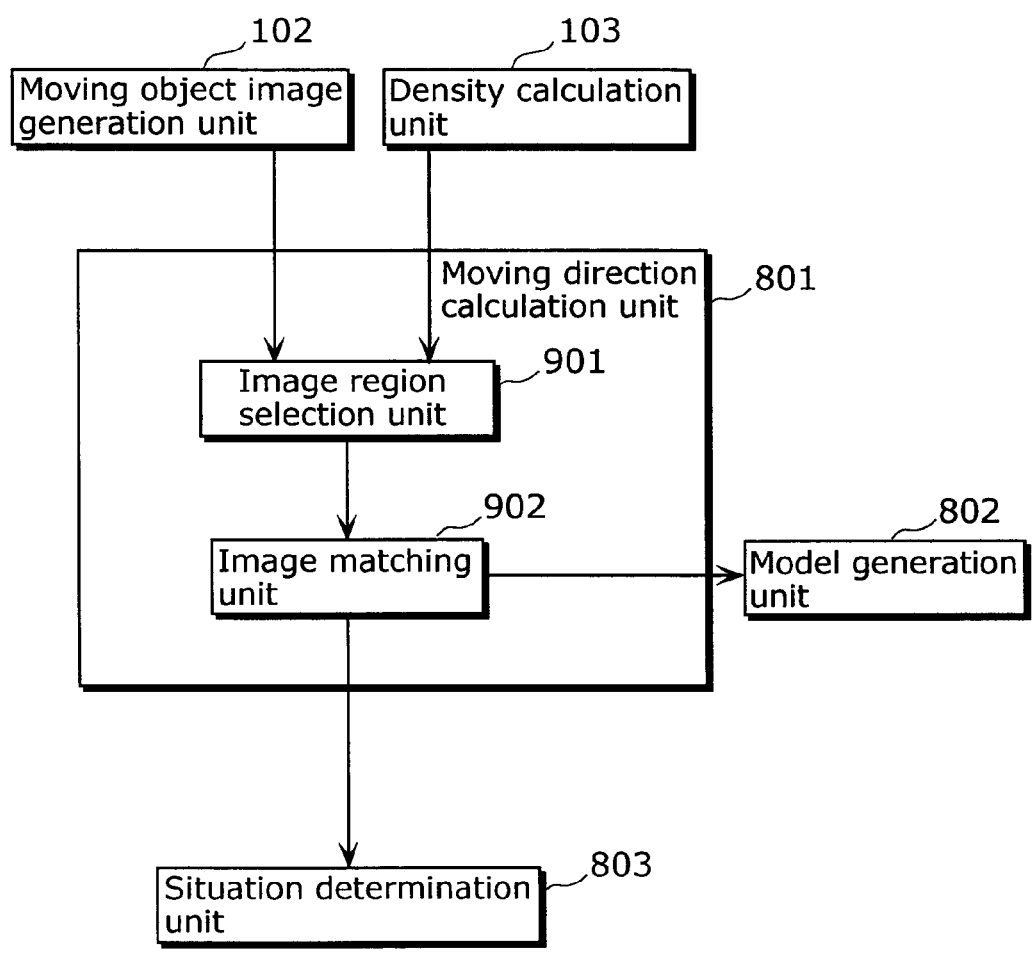
FIG. 12 is a block diagram showing a structure of a moving direction calculation unit of the monitoring device according to the third embodiment of the present invention.
Figure 13:
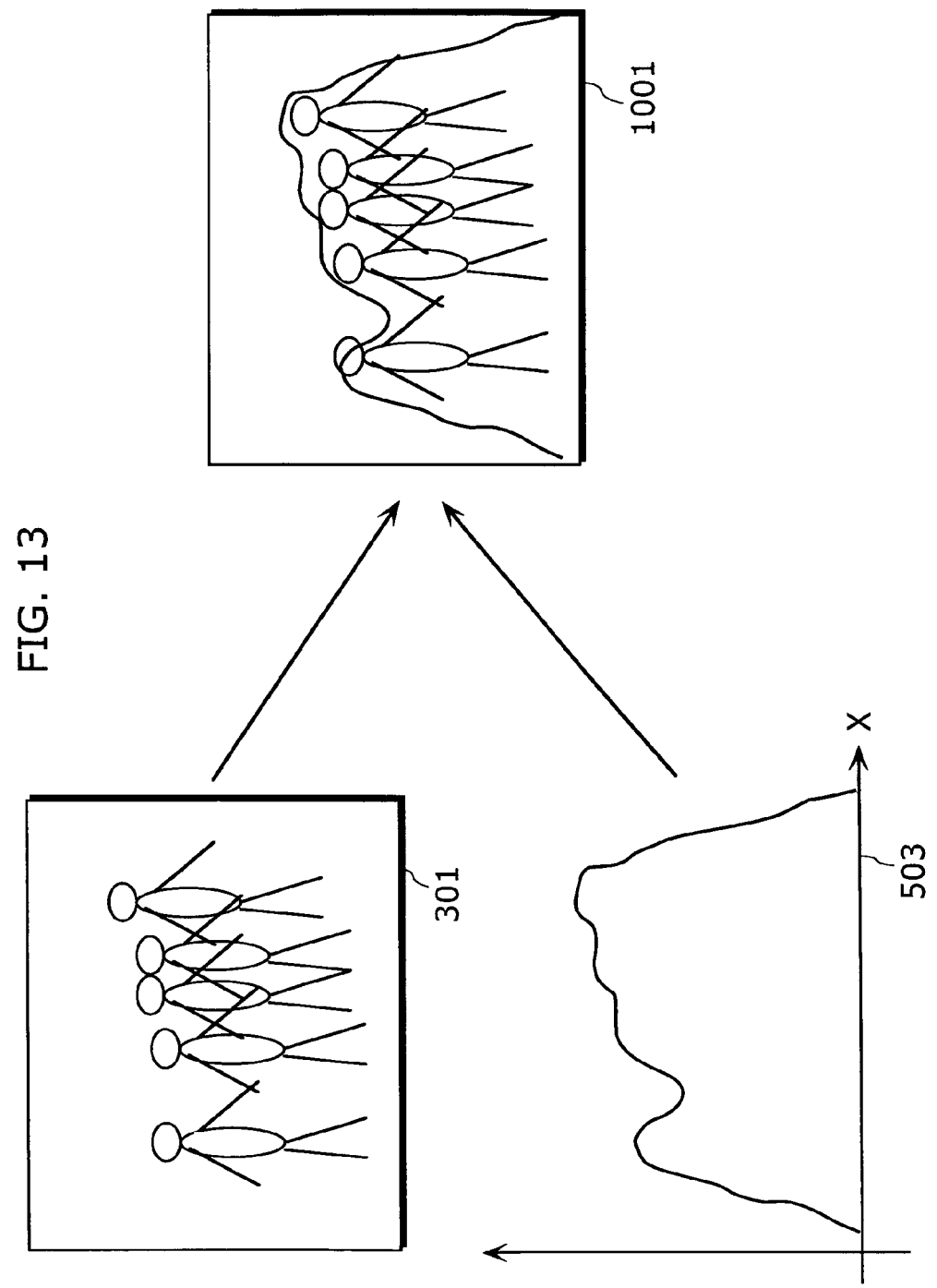
FIG. 13 is a diagram for explaining an operation performed by the monitoring device according to the third embodiment of the present invention.

As shown in FIG. 12, the moving direction calculation unit 801 includes an image region selection unit 901 and an image matching unit 902. As shown in FIG. 13, the image region selection unit 901 obtains a region selection image 1001 by partitioning the region of the input image 301 which is captured at that time with the inverse transformation result 503 obtained by performing low-pass processing on the input image 301, based on the inverse transformation result 503 that is frequency analysis processed one-dimensional information (a density). The image matching unit 902 then performs matching between the region selection image 1001 and the current input image. At this time, the image matching unit 902 enlarges, downsizes or moves in parallel the region selection image 1001 so that the region selection image 1001 best matches with the current input image. Consequently, the image matching unit 902 obtains information about a parameter relating to an enlargement or downsizing performed at the time of which the region selection image 1001 best matches with the current input image and about a parallel movement parameter in a vertical axis direction and a horizontal axis direction. This parameter arranged in a one-dimensional plane is called moving direction.

The image matching unit 902 then provides a parameter value relating to the obtained enlargement or downsizing and a parallel movement to the model generation unit 802 and the situation determination unit 803.

The model generation unit 802 can also make the database 105 hold one-dimensional data in which the parameter relating to an enlargement or downsizing performed at the time of which the region selection image 1001 best matches with the current input image and the parallel movement parameter in a vertical axis direction and a horizontal axis direction are arranged.

Also, as described in the first embodiment, time variations may be taken into consideration. In specific, a mean value and a variance value of each element are calculated and stored, by considering a time variation of each element of the one-dimensional information obtained by the image matching unit 902, in which the parameter relating to an enlargement or downsizing performed at the time of which two region selection images 1001 best matches with each other and the parallel movement parameter in a vertical axis direction and a horizontal axis direction are arranged. Here, the information stored in the database 105 as a reference moving direction is one-dimensional information in which parameter values relating to an enlargement, a downsizing, a parallel movement and the like are arranged or one-dimensional information in which mean values and variance values of respective parameter values are arranged.

It should be noted that the image matching unit 902 may perform matching of images using a matching method other than the matching method of using the enlargement, downsizing and parallel movement.

The situation determination unit 803 performs matching between the parameter value at the current time calculated by the image matching unit 902 and the parameter value (a reference moving direction) calculated from the image in a normal state stored in the database 105. Here, the situation determination unit 803 selects a model (a reference moving direction) stored in the database 105 based on the information such as a current season, time, weather condition, and day of the week, and compares the information with the input information inputted at the current time from the density calculation unit 103.

At this time, the situation determination unit 803 uses, as the one-dimensional information generated from the input image, the parameter value relating to the enlargement, downsizing and parallel movement used for image matching as used in the generation method of the parameter value calculated from the image in a normal state. The situation determination unit 803 then generates an inner product value obtained by calculating an inner product between the one-dimensional information indicating the parameter value used for image matching at the current time and the one-dimensional information calculated from the image in the normal state, generates a determination result by determining whether or not the inner product value is equal to or more than a threshold, and provides the determination result to the notification unit 107. This determination result indicates that an abnormal state is occurring when the inner product value between the one-dimensional information indicating the parameter value used for image matching and the one-dimensional information calculated from the image in the normal state is equal to or more than the threshold. For example, the monitoring device 800 can determine that an abnormal state is occurring, in the case where moving objects and a crowd do not move because of a conflict between groups even if the moving objects and the crowd move in a normal state.

Here, the occurrence of an abnormal state is determined based on the inner product value of the one-dimensional information. However, the determination may be performed based on a similarity between the one-dimensional information calculated from the image in the normal state and the one-dimensional information calculated from the image at the current time. At this time, it is also effective to multiply each element with a weighting coefficient. Also, the situation determination unit 803 compares between the moving direction at the current time and the reference moving direction stored in the database 105 and determines an occurrence of an abnormal state in the case where the moving direction at the current time is equal to or more than a predetermined threshold than the reference moving direction.

It should be noted that the first embodiment and the third embodiment of the present invention can be combined.

As described in the above, according to the third embodiment of the present invention, by not detecting and tracking separately an image of moving objects or of a crowd in an overall image but by capturing the images at a macro level, even in the case where a part such as a person's face cannot precisely be detected, a detection miss, a tracking miss and a matching miss can be prevented from occurring and an attention can be brought to a surveillant by determining that an abnormal state is occurring in the case where the moving direction of the moving objects or the crowd is greatly different from that in the normal state. In addition, according to the third embodiment, a moving direction of the moving objects or of the crowd can be easily calculated.

Fourth Embodiment

Figure 14:
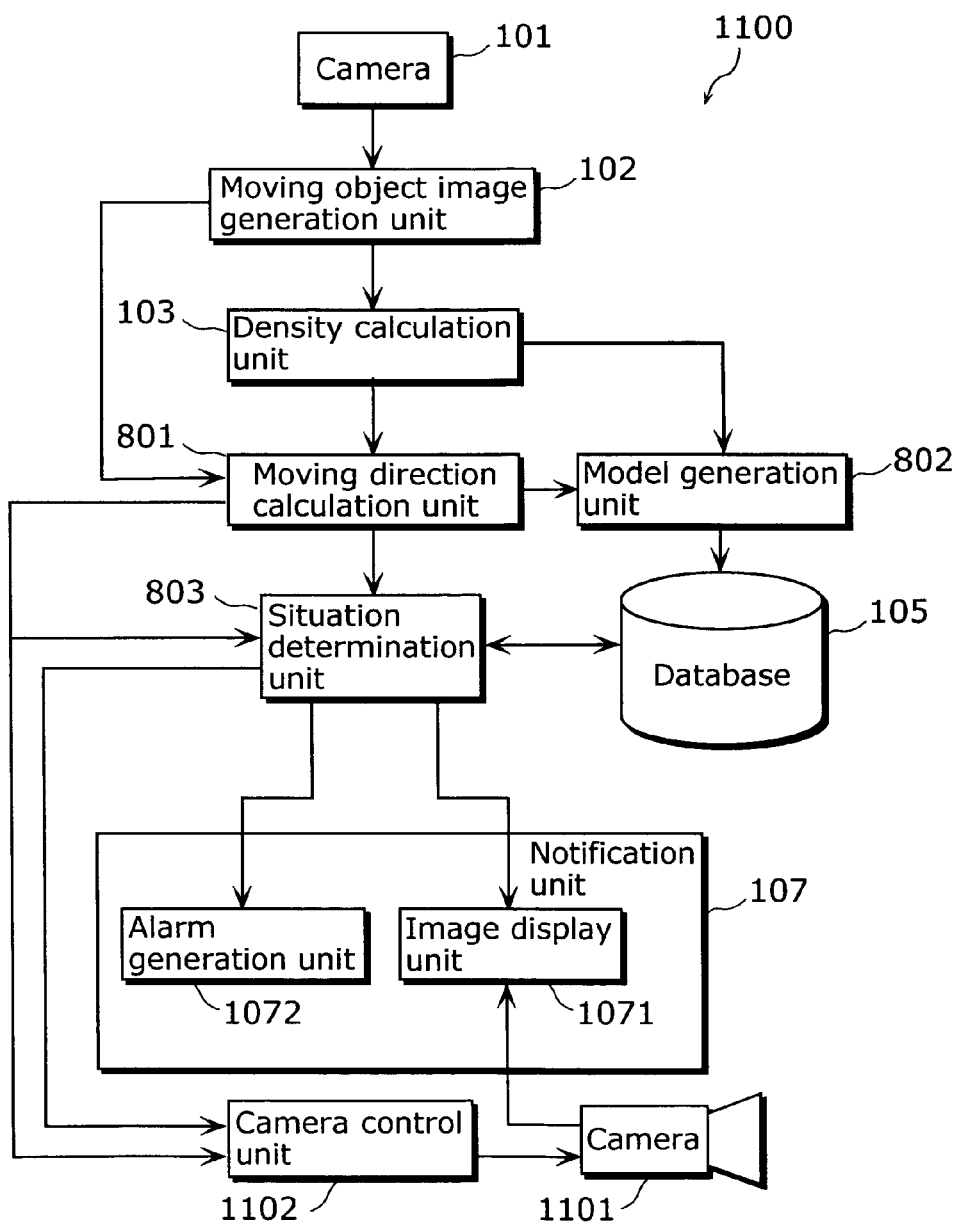
FIG. 14 is a block diagram showing a structure of a monitoring device according to a fourth embodiment of the present invention.

Next, a fourth embodiment of the present invention is explained with reference to drawings. FIG. 14 is a block diagram showing a structure of the monitoring device according to the fourth embodiment of the present invention. It should be noted that, in the fourth embodiment, same reference numbers are attached to constituents same as in the third embodiment of the present invention and the explanations of the same constituents are omitted hereinafter.

As shown in FIG. 14, a monitoring device 1100 according to the fourth embodiment of the present invention includes a camera 1101 and a camera control unit 1102 in addition to the constituents of the third embodiment of the present invention.

Figure 15B:
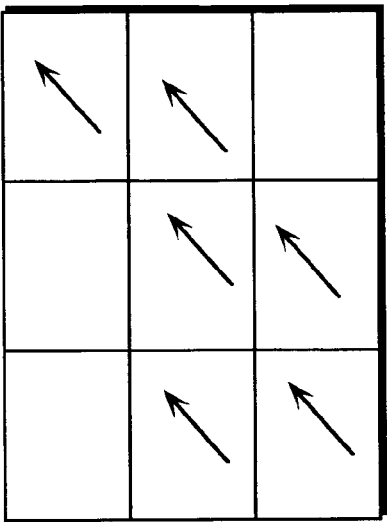
FIG. 15 is a diagram for explaining an operation performed by a camera control unit of the monitoring device according to the fourth embodiment of the present invention.
Figure 15D:
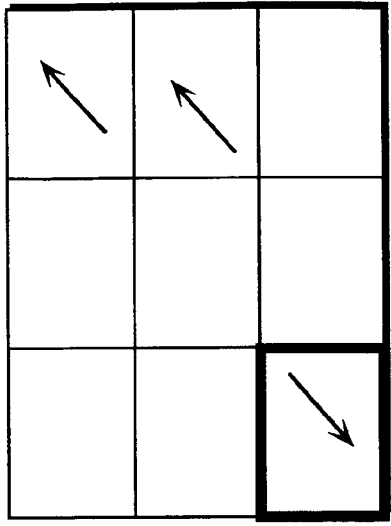
Figure 15A:
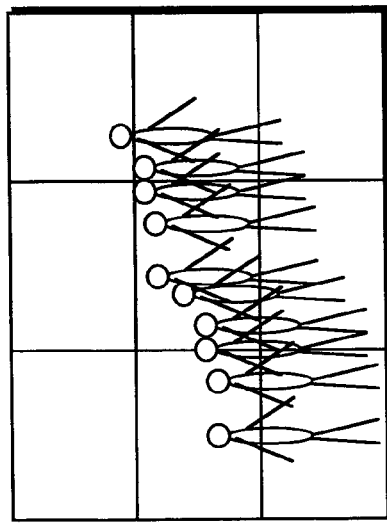
Figure 15C:
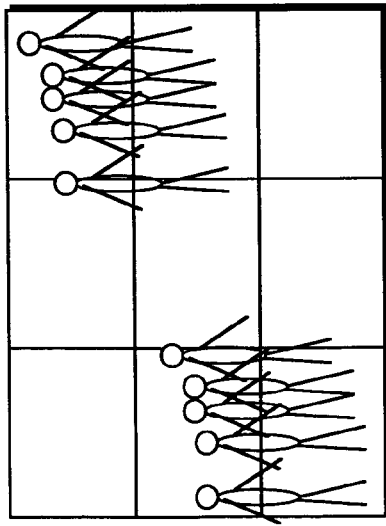

Here, it is described about an example of calculating a reference moving direction for each small region obtained by dividing an image into small regions. Each processing is performed on a small region-by-region basis. The camera 1101 has at least one of functions of pan, tilt and zoom. The density calculation unit 103 provides frequency analysis processed one-dimensional information to the camera control unit 1102. Also, the situation determination unit 803 provides a determination result to the camera control unit 1102. The camera control unit 1102 is explained with reference to FIG. 15. FIG. 15A is a diagram showing an image example 1301 in a normal state, showing an example of dividing an input image into nine small regions. FIG. 15B is a diagram showing a moving direction example 1302 for each small region in the normal state. FIG. 15C is a diagram showing an image example 1303 in the case when an abnormal state is occurring. FIG. 15D is a diagram showing a moving direction example 1304 in the case of the occurrence of the abnormal state. Here, in the case where the situation determination unit 106 determines that an abnormal state is occurring, the camera control unit 1102 controls the camera 1101 so as to face toward a region (a bottom left region in the example of FIG. 15D) in which a moving direction calculated by the moving direction calculation unit 801 is most different from the moving direction in the normal state (a reference moving direction) as shown in the moving direction example 1304 in the case of an occurrence of the abnormal situation. At this time, an image captured by the camera 1101 is provided to and displayed to the image display unit 1071.

As described in the above, according to the fourth embodiment of the present invention, in addition to the effects of the third embodiment of the present invention, a more detailed image can be obtained by which the camera 1101 captures an image of a region where an abnormal situation is occurring based on the judgment result of the occurrence of the abnormal state.

Note that the present invention is not only limited to the present embodiment indicating that the camera control unit 1102 controls the camera 1101 so that the camera 1101 faces a region in which the moving direction calculated by the moving direction calculation unit 801 is most different from the reference moving direction for as much as or more than a predetermined threshold. For example, the camera control unit 1102 may control the camera 1101 so that the camera 1101 faces toward a region in which the moving direction calculated by the moving direction calculation unit 801 is different from the reference moving direction for as much as or more than the predetermined threshold and where one-dimensional information has a peak value. Also, the camera control unit 1102 may control the camera 1101, for example, so that the camera 1101 sequentially faces toward plural regions in which the moving direction calculated by the moving direction calculation unit 801 is different from the reference moving direction for as much as or more than the predetermined value.

Fifth Embodiment

In the present embodiment, a method of calculating a density from an inputted image using an area of a person's head part candidate region and an area occupied by the person. The structure of a monitoring device according to the fifth embodiment of the present invention is same as the structure shown in FIG. 2.

The camera 101 generates an overall image by capturing an image of objects that are moving including moving objects or a crowd. Here, it is desired to use a color image or an infrared image. The moving object image generation unit 102 may perform background differential processing.

Figure 16A:
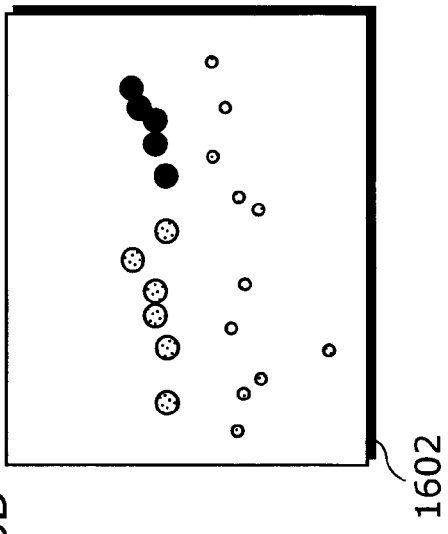
FIG. 16 is a diagram for explaining an operation of detecting a head part candidate region performed by a monitoring device according to a fifth embodiment of the present invention.
Figure 16B:
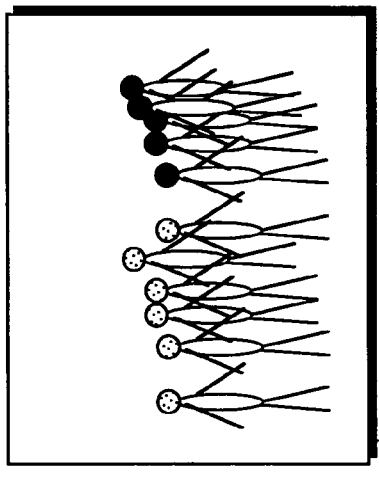
Figure 16C:
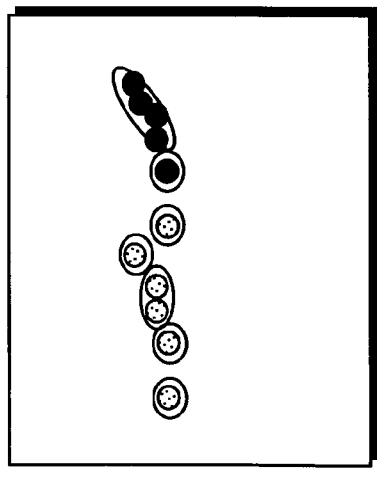

Next, it is explained about the case where the density calculation unit 103 detects a head part. The density calculation unit 103 extracts black region or a skin color region and obtains a detection result 1602 as shown in FIG. 16B. The density calculation unit 103 then detects ellipses which correspond to head parts, obtains an ellipse detection result 1603 as shown in FIG. 16C, and calculates an area of head part candidate region included in the image. It should be noted that the density is calculated at a macro level so that the operation is not broken down even in the case where ellipses corresponding to head parts are not correctly detected such as in the case where persons are overlapped as in the example of FIG. 16. Also, even in the case where the number of head parts cannot be detected correctly, a normal operation can be expected.

Next, it is explained about the case where the density calculation unit 103 calculates a region occupied by the persons in the image. It is desired for the camera 101 to use an infrared image. In this case, the density calculation unit 103 calculates the number of pixels in which the human region dominates detected from the infrared image. It is obvious that the human region may be separated after skin color detection and the like are performed on the infrared image. Note that, it is not necessary to extract correctly the human region as in the case of detecting the area of the head part candidate region.

Here, the density can be defined by an area of the head part candidate region or the number of pixels or a ratio of the human region in an image, and the like.

Next, it is explained about an operation for the model generation unit 104 to generate a reference density (a model value). Here, the reference density is a density of moving objects or of a crowd generated from an overall image in a normal state, and indicates the area of the head part candidate region that becomes the basis for determining an occurrence of an abnormal state, the number of pixels or the ratio of the human region in the image.

Note that, in order to adapt to a temporal variation of the density, the reference density may use a mean value and a variance value for a predetermined period of time. The model generation unit 104 stores the calculated reference density into the database 105. Also, it is desired to prepare reference densities for respective weather conditions since it is considered that the number of persons is changeable depending on weather conditions. Further, in the case of an outdoor on a rainy day, there will be a person who has an umbrella so that the frequency analysis processed one-dimensional information (a density) differs in the case of a sunny day and a cloudy day. Similarly, it is desired to prepare plural reference densities for each day since it is considered that the number of persons is changeable depending on a day of the week as in the case of a weekday and a weekend. Also, plural reference densities can be generated so as to correspond to pieces of information relating to a season, time, weather condition or day of the week. The model generation unit 104 can then determine which one of the reference densities to be used depending on the current season, time, weather condition or day of the week while being monitored.

Next, it is explained about a situation determination unit 106. The situation determination unit 106, based on the information such as a current season, time, weather condition or day of the week, selects a reference density (a model value) stored in the database 105, compares between the selected reference density and the density (one-dimensional information) at the current time inputted from the density calculation unit 103, determines whether or not the density at the current time is different from the reference density, generates a determination result and provides the generated determination result to the notification unit 107.

In the situation determination unit 106, the comparison between the density at the current time and the reference density is calculated as a deviation of the reference density (the model value) from the mean value and the variance value $\sigma$. As one example, the situation determination unit 106 can determine that an abnormal state is occurring in the case where the value of density is apart for as much as or more than a predetermined $N\sigma$ (N is a constant) from the variance value $\sigma$ of the reference density (the model value).

Next, it is described about the notification unit 107. The notification unit 107 includes an image display unit 1071 and an alarm generation unit 1072.

The image display unit 1071 notifies the surveillant on display in response to the determination result from the situation determination unit 106. The alarm generation unit 1072 notifies the surveillant by generating an alarm sound or an alarm light when the determination result indicates that an abnormal situation is occurring in response to the determination result from the situation judgment unit 106.

As described above, according to the fifth embodiment of the present invention, by not detecting and tracking separately an image of moving objects or of a crowd in an overall image but at a macro level, a detection miss, a tracking miss and a matching miss can be prevented from occurring and an attention can be brought to the surveillant by determining that an abnormal state is occurring in the case where the density of the moving objects or of the crowd is greatly different from that in the normal state. In addition, according to the fifth embodiment, a density of the moving objects or of the crowd can be easily calculated with lesser amount of calculation compared with in the first embodiment.

Sixth Embodiment

Next, the sixth embodiment of the present invention is described. The structure of the monitoring device according to the sixth embodiment of the present invention is same as the structure shown in FIG. 2.

In the present embodiment, a camera (an image-capturing unit) 101, a moving object image generation unit 102, a density calculation unit 103 are same as those described in the first embodiment. Therefore, the explanations about the same constituents are omitted hereinafter.

Whereas the model generation unit 104 can perform arithmetic operation simply using an arithmetic mean value and a variance value in the case of generating a reference density (a model value), it is explained here about an example of calculating and applying the reference density using approximations of functions.

This background image generation method is a method of modeling a background image at random using plural Gaussian distributions for each pixel, and learning images that are sequentially inputted. For example, for a pixel which is always varying such as shaking of trees, there is an advantage that the pixel can define a background including the variations. The model generation unit 104 in the monitoring device 100 of the present invention can generate a model adaptable to environmental changes by considering the one-dimensional information inputted in the normal state as information to be the basis as well as the background.

Here, the reference density is a density of the moving objects or of the crowd generated from the overall image in a normal state and is one-dimensional information that becomes the basis for determining an occurrence of an abnormal state.

As a method of generating a model that is a reference density, a histogram 303 and a vertical axis detection value 402 of an on-pixel can be used. Further, the frequency processing unit 211 uses methods of using an inverse transformation result 503 obtained by performing low-pass processing on the histogram 303 that is the one-dimensional information as shown in FIG. 6 and of using a Fourier spectrum or a cepstrum coefficient. The method of using the inverse transformation result 503 obtained by processing the one-dimensional information with a low-pass filter is described hereinafter. It should be noted that the model can also be generated by the method of generating a model using the Fourier spectrum or the cepstrum coefficient in the same way as used in the method using the inverse transformation result 503.

The model generation unit 104 constitutes a reference density calculation unit which calculates a reference density (a model value) of the moving objects or of the crowd based on frequency analysis processed one-dimensional information (a density) at a predetermined date and time calculated by the frequency processing unit 211. The model generation unit 104 stores the calculated reference density into the database 105.

The model generation unit 104 can perform arithmetic operation on the reference density for each season, time, weather condition or day of the week, and also can prepare plural reference densities in consideration of the season and the current time.

Also, it is desired to prepare plural reference densities for respective weather conditions since it is considered that the number of persons is changeable. In the case of an outdoor on a rainy day, there will be a person who has an umbrella so that the frequency analysis processed one-dimensional information (the density) is also different in the case for a sunny day and a cloudy day. Similarly, it is desired to prepare plural reference densities since the number of persons is changeable depending on a day of the week as in the case of a weekday and a weekend. In addition, the model generation unit 104 can generate plural reference densities so as to be associated with the current season, time, weather condition or day of the week, and can determine which one of the reference densities to be used according to the current season, time, weather condition or day of the week while being monitored.

Here, it is explained about an example of a reference density arithmetic operation performed by the model generation unit 104 in the case where the inverse-transformation result 503 is used as the frequency analysis processed one-dimensional information (a density). The same processing can be performed using the histogram 303 and the vertical axis detection value 402 of the on-pixel instead of using the inverse transformation result 503.

Figure 17:
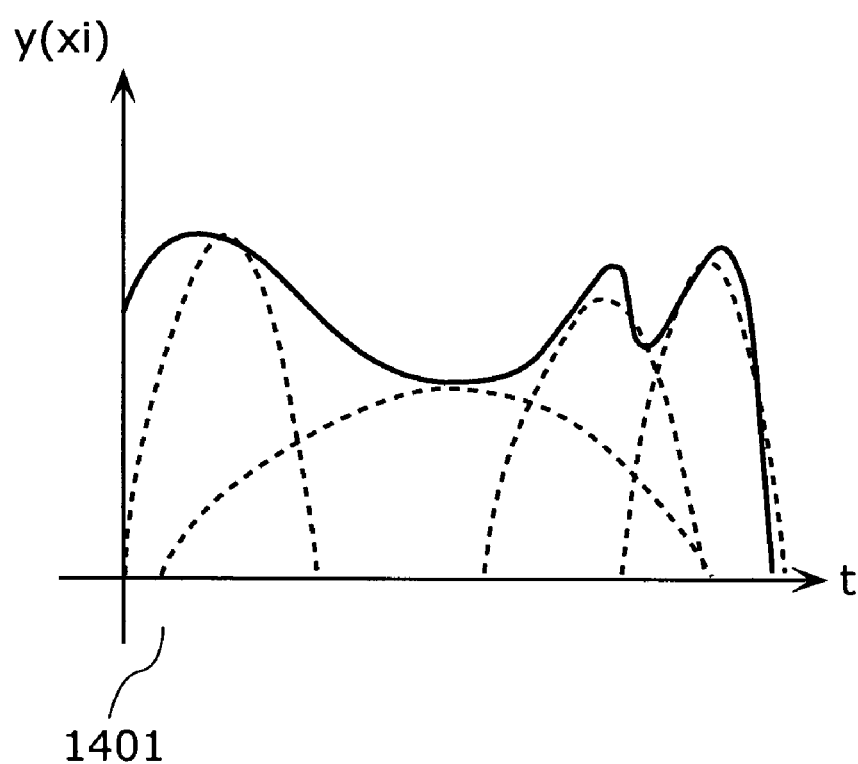
FIG. 17 is a diagram for explaining a modeling using Gaussian distributions performed by a monitoring device according to a sixth embodiment of the present invention.

The inverse transformation result 503 has values y(xi) for respective points xi on the x axis. Here, a reference density (a model value) is calculated by modeling the time variance of y(xi) that is a result of inverse transformation of each point xi. Here, it is explained about an example of using the background image generation method disclosed in C. Stauffer, W. E. L. Grimson: "Adaptive background mixture models for real-time tracking", CVPR'99, Vol. 2, pp. 246 to 252. Here, plural Gaussian distributions indicated, for example, as dotted lines in FIG. 17 are fitted to the time variation of y(xi). Consequently, the time variation of y(xi) can be presented as a parameter indicating the number of Gaussian distributions, a mean value and a variance value of respective Gaussian distributions.

In the present embodiment, this parameter set is referred to as a reference density (a model value) and is stored in the database 105.

Through modeling, the variance value becomes larger when the density variation is greater depending on a day of the week, date and time. Also, in the case where the density variation is small and there are few persons, both of the mean value and the variance value become smaller values. Therefore, the density in a normal state can be modeled in consideration of time variations. Further, by modeling with plural Gaussian distributions, in the case where a region near a signal is monitored, the densities which periodically vary depending on changes of the signal can be modeled.

Also, in the case of using the Fourier spectrum and the cepstrum coefficient, the modeling can be performed using time variations of a spectrum value and a cepstrum value of each frequency or each cepstrum order.

For example, in the case of using the Fourier cepstrum, the time variation of g(fi) can be presented as a set of parameters indicating the number of Gaussian distributions, a mean value and a variance value of the respective Gaussian distributions since there is a power spectrum value g(fi) corresponding to each frequency fi.

Here, the database 105 holds the parameter set as the reference density (the model value). It is obvious that the parameter set can be updated every predetermined period of time.

Next, it is described about the situation determination unit 106. The situation determination unit 106 selects a reference density (a model value) stored in the database 105 based on the information such as a current season, time, weather condition or day of the week, determines whether or not the density (one dimensional information) at the current time inputted from the density calculation unit 103 is different from the selected reference density by comparing each other, generates a determination result, and provides the generated determination result to the notification unit 107.

The situation determination unit 106 calculates a degree of deviation of the reference density (the model value) from the mean value and the variance value σ, in the comparison between the density at the current time and the reference density.

Here, in the determination of an occurrence of an abnormal state, a histogram that is one-dimensional information and the like are generated from the input image, and y(xi) and g(fi) at each point on the x axis, frequency or cepstrum order are further calculated from the frequency analysis processed one-dimensional information on which frequency analysis processing is performed, as a density at the current time. The situation determination unit 106 then determines whether or not an abnormal situation is occurring by setting a threshold and its range from the reference density (the model value) that is obtained by modeling y(xi) and g(fi) using the Gaussian distributions.

Next, it is described about the notification unit 107. The notification unit 107 includes an image display unit 1071 and an alarm generation unit 1072.

The image display unit 1071 receives and notifies the surveillant of the determination result from the situation determination unit 106. The alarm generation unit 1072 notifies the surveillant by generating an alarm sound or an alarm light when the determination result indicates that an abnormal situation is occurring, in response to the determination result from the situation determination unit 106.

It should be noted that the model generation unit 104 may calculate a reference density (a model value) for each predetermined period of time so as to obtain a new reference density (a model value), provide the obtained new reference density, and update the reference density (the model value), in order to adapt to the case where the distributions of moving objects such as a traffic change according to an environmental change.

As described in the above, according to the sixth embodiment of the present invention, by not detecting and tracking separately an image of moving objects or of a crowd in an overall image but by capturing the image at a macro level, a detection miss, a tracking miss and a matching miss can be prevented from occurring and an attention can be brought to the surveillant even in the case where a part such as a person's face cannot be detected precisely, by judging an abnormal state in the case where the density of the moving objects or of the crowd is greatly different from that in the normal state. In addition, according to the sixth embodiment of the present invention, a density of the moving objects or of the crowd can be easily calculated with lesser amount of calculation, and the time variations can be more precisely modeled in addition to the effects obtained in the first embodiment.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The monitoring device according to the present invention is useful for determining an occurrence of an abnormal state of moving objects or a crowd, for example, at a station, in a shopping street, on a street and the like.

The invention claimed is:

1. A monitoring device which monitors a region to be monitored, said device comprising:
   an image-capturing unit to capture an image within the monitored region, and to generate an input image;
   a moving object image generation unit to generate, from the input image generated by said image-capturing unit, a moving object image that is an image of moving objects or of a crowd; and
   a density calculation unit to calculate, based on the moving object image generated by said moving object image generation unit, a degree of density of the moving objects or of the crowd, as a density that is parameterized by a function approximation or a frequency transformation,
   wherein said moving object image generation unit generates the moving object image by performing differential processing on the input image,
   wherein said density calculation unit transforms the moving object image on which the differential processing has been performed, into one-dimensional information, and calculates the density based on the transformed one-dimensional information, and
   wherein said density calculation unit transforms the moving object image on which the differential processing has been performed, into one-dimensional information, by: binarizing each of a plurality of pixel values of the moving object image on which the differential processing has been performed, through conversion into either a first value or a second value; scanning the binarized moving object image in a direction of a vertical axis from a top part of the moving object image for each of a plurality of values on a horizontal axis of the moving object image; and projecting, to the horizontal axis, detected vertical axis values each of which is a maximum value on the vertical axis of a pixel which has been detected first in the scanning and has the first value.

2. A monitoring method for monitoring a region to be monitored, said method comprising:
   capturing, using an image-capturing unit, an image within the monitored region and generating an input image;
   generating, from the input image generated in said capturing of the image, a moving object image that is an image of moving objects or of a crowd; and
   calculating, using a computer, a degree of density of the moving objects or of the crowd based on the moving object image, as a density that is parameterized by a function approximation or a frequency transformation,
   wherein said generating the moving object image comprises generating the moving object image by performing differential processing on the input image,
   wherein said calculating comprises transforming the moving object image on which the differential processing has been performed, into one-dimensional information, and calculating the density based on the transformed one-dimensional information, and wherein said transforming the moving object image on which the differential processing has been performed, into one-dimensional information, comprises: binarizing each of a plurality of pixel values of the moving object image on which the differential processing has been performed, through conversion into either a first value or a second value; scanning the binarized moving object image in a direction of a vertical axis from a top part of the moving object image for each of a plurality of values on a horizontal axis of the moving object image; and projecting, to the horizontal axis, detected vertical axis values each of which is a maximum value on the vertical axis of a pixel which has been detected first in the scanning and has the first value.

3. A non-transitory computer-readable recording medium having a program stored thereon for monitoring a region to be monitored, said program causing a computer to execute a method comprising:

capturing, using an image-capturing unit, an image within the monitored region and generating an input image;

generating, from the input image generated in said capturing of the image, a moving object image that is an image of moving objects or of a crowd; and calculating, using a density calculation unit, a degree of density of the moving objects or of the crowd based on the moving object image, as a density that is parameterized by a function approximation or a frequency transformation, wherein said generating the moving object image comprises generating the moving object image by performing differential processing on the input image, wherein said calculating comprises transforming the moving object image on which the differential processing has been performed, into one-dimensional information, and calculating the density based on the transformed one-dimensional information, and wherein said transforming the moving object image on which the differential processing has been performed, into one-dimensional information, comprises: binarizing each of a plurality of pixel values of the moving object image on which the differential processing has been performed, through conversion into either a first value or a second value; scanning the binarized moving object image in a direction of a vertical axis from a top part of the moving object image for each of a plurality of values on a horizontal axis of the moving object image; and projecting, to the horizontal axis, detected vertical axis values each of which is a maximum value on the vertical axis of a pixel which has been detected first in the scanning and has the first value.

* * * * *